(12) United States Patent
Shimizu

(10) Patent No.: US 6,737,517 B2
(45) Date of Patent: May 18, 2004

(54) METAL CHELATED AZO DYESTUFF FOR INKJET RECORDING AND RECORDING LIQUID FOR INKJET AND INKJET RECORDING METHOD USING SAME

(75) Inventor: Wataru Shimizu, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/216,290

(22) Filed: Aug. 12, 2002

(65) Prior Publication Data

US 2003/0149251 A1 Aug. 7, 2003

Related U.S. Application Data

(63) Continuation of application No. PCT/JP01/01242, filed on Feb. 21, 2001.

(30) Foreign Application Priority Data

| Feb. 22, 2000 | (JP) | 2000-044315 |
| Feb. 25, 2000 | (JP) | 2000-048718 |
| Mar. 1, 2000 | (JP) | 2000-055259 |
| May 12, 2000 | (JP) | 2000-139952 |

(51) Int. Cl.$^7$ .................. C09B 45/24; C09D 11/02
(52) U.S. Cl. ............... 534/704; 534/708; 534/714; 106/31.5; 106/31.52
(58) Field of Search ............... 534/704, 708, 534/714; 106/31.5, 31.52

(56) References Cited

U.S. PATENT DOCUMENTS 2,982,764 A * 5/1961 Bitterlin et al. ............. 534/714
4,804,411 A * 2/1989 Eida et al. ............... 106/31.48

FOREIGN PATENT DOCUMENTS

| EP | 0 233 769 A2 | 8/1987 |
| EP | 0 549 342 A2 | 6/1993 |
| JP | 63-199780 | 8/1988 |

\* cited by examiner

Primary Examiner—Fiona T. Powers
(74) Attorney, Agent, or Firm—Oblon, Spivak, McClelland, Maier & Neustadt, P.C.

(57) ABSTRACT

A metal chelated azo dyestuff containing at least one hydrophilic group and having formula (1):

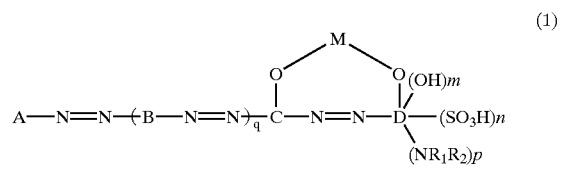

wherein M is a metal; A, B and C are each independently a substituted or unsubstituted aromatic ring; D is an aromatic ring optionally substituted by a group other than an azo group; m is 0 or 1; n is an integer from 0 to 3; p is an integer from 0 to 2; q is an integer from 1 to 3; with the proviso that in the event of a plurality of B's, they are the same or different; $R_1$ and $R_2$ are each independently hydrogen or a substituent group; M is tridentate or of higher coordination; and optionally a metal ion coordinated to A and B, B and B in the event of plural B's separated by azo or B and C, in the form of the structure: —O—M—O—.

53 Claims, No Drawings

METAL CHELATED AZO DYESTUFF FOR INKJET RECORDING AND RECORDING LIQUID FOR INKJET AND INKJET RECORDING METHOD USING SAME

This application is a continuation of PCT/JP01/01242 filed Feb. 21, 2001.

TECHNICAL FIELD

The present invention relates to a metal chelated azo dyestuff for inkjet recording, a recording liquid and recording liquid for inkjet containing the dyestuff and an inkjet recording method using the dyestuff. More particularly, the present invention relates to a metal chelated azo dyestuff for inkjet recording which can be preferably used as a black dyestuff in inkjet recording, a recording liquid for inkjet and an inkjet recording method.

BACKGROUND ART

A so-called inkjet recording method which allows droplets of a recording liquid containing water soluble dyestuffs such as direct dye and acidic dye to be ejected from a minute ejection orifice to effect recording has been put to practical use. The recording liquid for use in the inkjet recording method requires that it be able to be ejected over an extended period of time. The recording liquid also requires that it be fixed rapidly on PPC (plain paper COPIA) paper such as electrophotographic paper and fanhold paper (recording paper widely used for general official purposes such as continuous paper for computer, etc.) and give a printed matter having a good print quality, i.e., print having a definite contour free of running. The recording liquid further requires that it exhibit an excellent storage stability as a recording liquid. Accordingly, the solvent which can be used in the recording liquid is remarkably limited.

On the other hand, the dyestuff for recording liquid requires that it has a sufficient solubility in the solvent thus restricted and remain stable even after prolonged storage in the form of recording liquid. The dyestuff for recording liquid also requires that it gives a printed image having a high density and an excellent water resistance and light-fastness. However, it was difficult to meet these many requirements at the same time.

Further, the inkjet recording has been recently required to have adaptability to printing photo-like image, graphic image or the like (hereinafter abbreviated as "photographic image") which is drastically improved as compared with the conventional inkjet recording. The black recording liquid for use in the printing is required to have further improvement in achromaticity of printed image. Further, unlike the letter printing involving printing with a density of 100%, the photographic image often employs so-called halftone printing involving 80% halftone dot meshing printing or 70% halftone dot meshing printing. In this printed area, the color of printed matter is gray rather than black. Therefore, the delicate hue of dyestuff which is not highlighted in 100% solid printed area, i.e., black printed area becomes highlighted.

In order to numerically express the achromaticity of the halftone area, halftone dot meshing printing is effected with a black ink at an arbitrary print density of from 0% to 100%, e.g., 80% using, e.g., "halftone dot meshing function" of a commercially available graphic software or word processing software. The printed matter thus obtained may be measured for saturation (C* value) by means of a commercial colorimeter. C* is an index indicating the saturation of color of image. In the case of black image, as C* value is closer to zero, it indicates that the color of the image is a pure black or gray having less color hue to advantage. In order to give a satisfactory inkjet recorded image, it is desired that C* value of a halftone dot meshing image printed at a density of 80% which normally looks a dark gray be not greater than 8, preferably not greater than 7.5, more preferably not greater than 7, particularly not greater than 4.

However, it has heretofore been extremely difficult to obtain a pure black free of delicate hue such as greenish, reddish and bluish hues, i.e., achromatic black image over a wide print density range from light to dark color using a single dyestuff. In other words, when an image subjected to halftone dot meshing printing at a density of 80% in the same manner using a single dyestuff which is normally used in inkjet recording is measured for saturation, C* value thus measured is from 10 to 15 or about 20 in the extreme case. Accordingly, a gray image which is not required to have color tone looks bluish, brownish or reddish.

Therefore, in general, a black inkjet recording liquid which contains a plurality of dyestuffs incorporated therein in combination to compensate deviation of color tone is used. However, this black inkjet recording liquid is disadvantageous in that different dyestuff molecules excessively prevent the agglomeration of the other dyestuff particles and catalytic fade causes deterioration of light-fastness.

On the other hand, in order to embody a highly fine and highly sharp image during IJ recording, particularly photographic image printing, a dedicated coated paper, dedicated glossy paper, etc. (hereinafter abbreviated as "dedicated paper") is used. However, when printed on recording media normally called photographic glossy paper, paper dedicated for inkjet, etc., the dyestuff tends to be acceleratedly decomposed under light due to the action of silicon oxide, aluminum oxide and a waterproofing agent such as polyamine which have been incorporated therein to form a highly fine and highly sharp image. As a result, when the photographically printed image obtained by inkjet recording method is posted indoor or outdoor, it can be easily discolored to disadvantage.

The light-fastness of an image can be numerically expressed as, e.g., discoloration value ($\Delta E$) determined by measuring the image which has been subjected to photo-deterioration acceleration test involving irradiation with, e.g., xenon arc light for degree of image discoloration from the initial value by means of a color difference meter. In order to provide a photographic image formed on dedicated paper by inkjet printing with a sufficient light-fastness, a black image having $\Delta E$ value of about 10 or less after 80 hours of irradiation with xenon arc light is required. However, the conventional dyestuffs can difficultly provide 100% solid printed area with the aforementioned desired light-fastness. Further, the conventional dyestuffs show more remarkable image discoloration due to light, often as extremely great as from 20 to 50 as calculated in terms of $\Delta E$ value, in a so-called halftone area such as 80% halftone dot meshing-printed area and 70% halftone dot meshing-printed area, which is often used in photographic image printing.

In an attempt to improve the achromaticity and light-fastness of a black image at the same time, various dyestuffs and recording methods have heretofore been proposed. However, a dyestuff has never been developed which meets sufficiently the aforementioned complicating and growing need of the market and can be easily prepared.

In general, a black recording liquid contains a disazo dyestuff, a trisazo dyestuff or a polyazo dyestuff containing more azo groups. These dyestuffs are used to form the aforementioned purer black, i.e., achromatic black image. However, this type of a dyestuff can difficultly meet the recent requirement for strict light-fastness, especially on dedicated paper.

In addition, the aforementioned requirement for achromaticity cannot be attained by the conventional polyazo dyestuffs such as disazo and trisazo dyestuffs. Therefore, it has been often practiced to adjust the color hue to higher achromaticity by using a complementary color or using a plurality of black dyestuffs in combination. As a result, the light-fastness, which is now insufficient, tends to be deteriorated more and more.

On the other hand, in an attempt to embody an sufficiently light-fast image, the application of an existing or novel metal chelated azo dyestuff which is considered excellent in light-fastness has been studied. For example, Japanese Patent Laid-Open No. 1990-75672 discloses that a metal chelated dyestuff is used for inkjet recording and exemplifies metal chelated dyestuffs having the following structures. Although these metal chelated dyestuffs have an improved light-fastness, they tend to have bluish tone and thus cannot sufficiently meet the recent need from the standpoint of achromaticity.

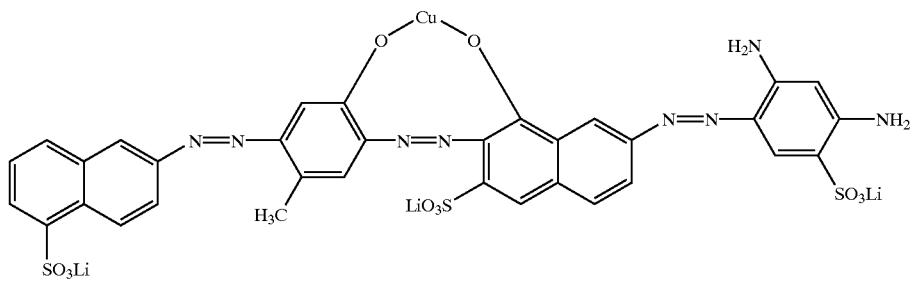

An aim of the present invention is to provide a dyestuff and recording liquid which allows recording with a sufficient light-fastness and a saturation that is low enough to give a desirable black tone even when subjected to inkjet recording on, e.g., dedicated paper as recording or writing utensils and a recording method using this recording liquid.

DISCLOSURE OF THE INVENTION

As a result of studies, the inventors found a dyestuff having a special structure having properties accomplishing the aforementioned aim and then worked out the present invention. The inventors confirmed that the use of a specific compound having a specific form of polyazo compound coordinated to a metal as ligand makes it possible to obtain an achromatic (close to ideal black) dyestuff having a high light-fastness and the use of this dyestuff makes it possible to obtain a recording liquid which can sufficiently meet the aforementioned market need for inkjet recording that sufficiently desirable achromaticity and light-fastness can be met at the same time even when printed on dedicated paper at a low density in the form of halftone. The present invention has thus been worked out.

It was further found that the aforementioned dyestuff can provide an excellent recording liquid which can keep a high light-fastness even when a complementary dyestuff is incorporated therein for toning.

In other words, the subject matter of the present invention lies in a metal chelated azo dyestuff for inkjet recording the free acid form of which is represented by the following general formula (1) or (1'), a recording liquid and a recording liquid for inkjet containing the metal chelated azo dyestuff and an inkjet recording method using the metal chelated azo dyestuff:

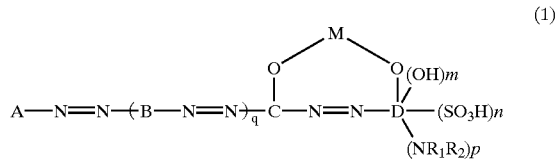

(wherein the general formula (1) represents a compound having at least one or more hydrophilic group per molecule; M represents an arbitrary metal; A, B and C each independently represents an aromatic ring which may have arbitrary substituents; D represents an aromatic ring which may have arbitrary substituents other than azo group; m represents an integer of 0 to 1; n represents an integer of from 0 to 3; p represents an integer of from 0 to 2; q represents an integer of from 1 to 3, with the proviso that if there are a plurality of B's, they may be the same or different; $R_1$ and $R_2$ each independently represents hydrogen atom or arbitrary substituent; M can take tridentate or higher coordination in which M may take arbitrary ligand-to-metal coordination at arbitrary substituent or bond in the general formula (1) or with arbitrary ligands; and a metal ion may be further coordinated to A and B, B and B which are adjacent to each other with an azo group interposed therebetween if there are a plurality of B's or B and C in the form of —O—M—O—),

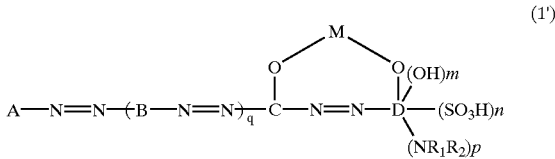

(wherein the general formula (1') represents a compound having at least one or more hydrophilic group per molecule; M represents an arbitrary metal; A, B and C each independently represents an aromatic ring which may have arbitrary substituents; D represents an aromatic ring which may have arbitrary substituents other than azo group; m represents an integer of 0 to 1; n represents an integer of from 0 to 3; p represents an integer of from 0 to 2; q represents an integer of from 1 to 3, with the proviso that if there are a plurality of B's, they may be the same or different; $R_1$ and $R_2$ each independently represents hydrogen atom or arbitrary substituent; and M can take tridentate or higher coordination in which M may take arbitrary ligand-to-metal coordination at arbitrary substituent or bond in the general formula (1) or with arbitrary ligands).

Further, the subject matter of the present invention lies in a recording liquid containing an aqueous medium, i) at least one black metal chelated azo dyestuff the free acid form of which is represented by the following general formula (8) or (8') and ii) at least one or more other water soluble dyestuff and an inkjet recording method:

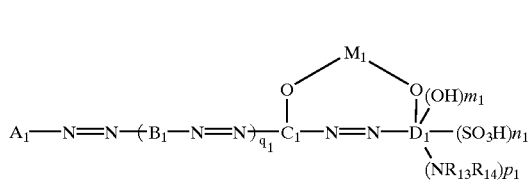

(8)

(wherein the general formula (8) represents a compound having at least one or more hydrophilic group per molecule; $M_1$ represents an arbitrary metal; $A_1$, $B_1$ and $C_1$ each independently represents an aromatic ring which may have arbitrary substituents; $D_1$ represents an aromatic ring which may have arbitrary substituents other than azo group; $m_1$ represents an integer of 0 to 1; $n_1$ represents an integer of from 0 to 3; $p_1$ represents an integer of from 0 to 2; $q_1$ represents an integer of from 0 to 3, with the proviso that if there are a plurality of $B_1$'s, they may be the same or different; $R_{13}$ and $R_{14}$ each independently represents hydrogen atom or arbitrary substituent; $M_1$ can take tridentate or higher coordination in which $M_1$ may take arbitrary ligand-to-metal coordination at arbitrary substituent or bond in the general formula (8) or with arbitrary ligands; and a metal ion may be further coordinated to $A_1$ and $B_1$, $B_1$ and $B_1$ which are adjacent to each other with an azo group interposed therebetween if there are a plurality of $B_1$'s or $B_1$ and $C_1$ in the form of —O—M—O—),

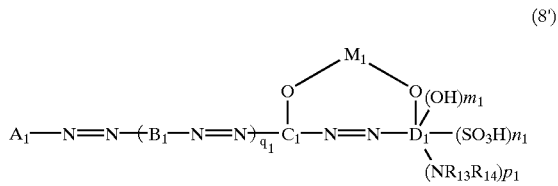

(8')

(wherein the general formula (8') represents a compound having at least one or more hydrophilic group per molecule; $M_1$ represents an arbitrary metal; $A_1$, B1 and $C_1$ each independently represents an aromatic ring which may have arbitrary substituents; $D_1$ represents an aromatic ring which may have arbitrary substituents other than azo group; m, represents an integer of 0 tot; $n_1$ represents an integer of from 0 to 3; $p_1$ represents an integer of from 0 to 2; $q_1$ represents an integer of from 0 to 3, with the proviso that if there are a plurality of $B_1$'s, they may be the same or different; $R_{13}$ and $R_{14}$ each independently represents hydrogen atom or arbitrary substituent; and $M_1$ can take tridentate or higher coordination in which $M_1$ may take arbitrary ligand-to-metal coordination at arbitrary substituent or bond in the general formula (8') or with arbitrary ligands).

In the specification of the present application, among the metal chelated azo dyestuffs the free acid form of which is represented by the general formula (1) or (8), those excluding embodiments in which a metal ion may be further coordinated to $A_1$ and $B_1$, $B_1$ and $B_1$ which are adjacent to each other with an azo group interposed therebetween if there are a plurality of $B_1$'s or $B_1$ and $C_1$ in the form of —O—M—O— are defined as a metal chelated azo dyestuff represented by the general formula (1') or (8'), respectively.

BEST MODE FOR CARRYING OUT THE INVENTION

The present invention will be further described hereinafter.

The dyestuff of the present invention is represented by the aforementioned general formula (1). The dyestuff represented by the general formula (1) is a trisazo compound or a polyazo compound having more azo groups which is a complex compound of a molecule having a phenol, naphthol or analogous hydroxyl group-containing aromatic ring incorporated therein at ends of a chain of aromatic rings connected with an azo group with an arbitrary metal. The metal chelated azo dyestuff of the present invention is a triazo or higher metal chelated dyestuff having substituted amino groups on the aromatic ring at right end.

The dyestuff of the present invention preferably has a molecular weight of not greater than 5,000, particularly not greater than 2,000.

The dyestuff represented by the general formula (1) is a water soluble dyestuff and has at least one or more hydrophilic group per molecule to have water solubility. Such a hydrophilic group is not specifically limited so far as it is a water soluble hydrophilic group which is commonly used as an inkjet recording liquid. Examples of the hydrophilic group include sulfonic acid group, carboxylic acid group, phosphoric acid group, etc. Preferred among these hydrophilic groups are sulfonic acid group and carboxylic acid group. The dyestuff of the general formula (1) wherein the number of hydrophilic groups is from 2 to 6 as a whole is suitable for properties of inkjet recording liquid.

In the dyestuff represented by the general formula (1) of the present invention, A, B, C and D each independently represents an arbitrary aromatic ring. At least one of A, B, C and D may have hetero rings. In order to optimize the properties of the dyestuff, the aromatic rings described as A, B, C and D may be substituted by arbitrary substituents properly selected depending on the purpose of the dyestuff. A, B, C and D each is preferably a benzene ring which may be substituted or a naphthalene ring which may be substituted. In particular, B and D each is preferably a naphthalene ring which may be substituted.

The proper substituents which A, B and C respectively have depending on the purpose of the dyestuff are not specifically limited. The substituents on D are not specifically limited so far as they are not azo groups.

In some detail, the substituents on A are preferably at least one or more substituent selected from the group consisting of halogen atom, phosphono group, sulfonic acid group, carboxyl group, hydroxyl group, nitro group, alkyl group (normally having from 1 to 10 carbon atoms, preferably from 1 to 5 carbon atoms) which may be substituted, alkoxy group (normally having from 1 to 10 carbon atoms, preferably from 1 to 5 carbon atoms) which may be substituted, amino group which may be substituted, acylamino group which may be substituted, sulfonylamino group which may be substituted, phenylazo group which may be substituted and naphthylazo group which may be substituted.

The substituents on B are preferably at least one or more substituent selected from the group consisting of halogen atom, phosphono group, sulfonic acid group, carboxyl group, hydroxyl group, nitro group, alkyl group (normally having from 1 to 10 carbon atoms, preferably from 1 to 5 carbon atoms) which may be substituted, alkoxy group (normally having from 1 to 10 carbon atoms, preferably from 1 to 5 carbon atoms) which may be substituted, amino group which may be substituted, acylamino group which may be substituted and sulfonylamino group which may be substituted.

The substituents on C are preferably at least one or more substituent selected from the group consisting of halogen atom, phosphono group, sulfonic acid group, carboxyl group, hydroxyl group, nitro group, alkyl group (normally having from 1 to 10 carbon atoms, preferably from 1 to 5 carbon atoms) which may be substituted, alkoxy group (normally having from 1 to 10 carbon atoms, preferably from 1 to 5 carbon atoms) which may be substituted, amino group which may be substituted, acylamino group which may be substituted and sulfonylamino group which may be substituted.

In particular, in the case where at least one of A, B and C rings has substituents, the substituents are preferably those selected from the group consisting of halogen atom, sulfonic acid group, carboxyl group, hydroxyl group, nitro group, alkyl group which may be substituted, alkoxy group which may be substituted, amino group which may be substituted, acylamino group which may be substituted and sulfonylamino group which may be substituted.

D may be further substituted by substituents other than those defined in the general formula (1), but azo groups are not directly connected to D ring. The substituents on D are preferably at least one substituent selected from the group consisting of halogen atom, carboxyl group, hydroxyl group, nitro group, alkyl group (normally having from 1 to 10 carbon atoms, preferably from 1 to 5 carbon atoms) which may be substituted, alkoxy group (normally having from 1 to 10 carbon atoms, preferably from 1 to 5 carbon atoms) which may be substituted, amino group which may be substituted, acylamino group which may be substituted, sulfonylamino group which may be substituted, alkoxycarbonyl group (normally having from 1 to 10 carbon atoms, preferably from 1 to 5 carbon atoms) which may be substituted and aminocarbonyl group.

In the case where A to D have substituents which further have substituents, the substituents each normally has from 1 to 10 carbon atoms, preferably from 1 to 5 carbon atoms.

The dyestuff represented by the general formula (1) of the present invention is synthesized by a method known per se [see e.g., Yutaka Hosoda, "Shinsenryou Kagaku (New Dye Chemistry)", Gihodo, Dec. 21, 1973, pp. 396–409] via diazo forming step and coupling step.

The dyestuff represented by the general formula (1) can be obtained, e.g., by converting an aromatic amine having a partial structure A to a diazo form, condensing the diazo compound to an aromatic amine having a partial structure B, further converting the compound thus obtained to a diazo form, condensing the diazo compound to an aromatic amine having a partial structure C, further converting the compound thus obtained to a diazo form, and then condensing the diazo compound to an aromatic compound having a partial structure D, i.e., by allowing a desired metal salt to act on a compound obtained by the successive repetition of conversion to diazo form and condensation.

Examples of the aromatic amine containing A as a partial structure include aromatic amines such as 4-nitroaniline, 2,6-dichloro-4-nitroaniline, 2-cyano-4-nitroaniline, 4-chloroaniline, sulfanilic acid, 2-aminobenzene-1,4-disulfonic acid, C acid, Dahl acid, 2-aminobenzoic acid, 3-aminobenzoic acid, 4-aminobenzoic acid, 3-aminophenylphosphoric acid, 2-aminoterephthalic acid, 3-aminoisophthalic acid, 2,5-diaminobenzoic acid and 5-amino-2-nitrobenzoic acid, heterocyclic aromatic amines such as 2-amino-3-aminocarbonyl-5-formylthiophene, 2-amino-6-carboxybenzothiazole, 2-amino-6-sulfobenzothiazole, 2-amino-4,5-dicyanoimidazole and 2-amino-4,5-dicarboxyimidazole, and derivatives thereof.

Examples of the aromatic amine containing B as a partial structure include aromatic amines such as 1-naphthylamine, 1,6-Cleve's acid, 1,7-Cleve's acid, 2-methoxyaniline, 2-ethoxyaniline, 2-amino-paracresidine, 2,5-dimethoxyaniline, 2,5-diethoxyaniline and 5-acetylamino-2-methoxyaniline, heterocyclic aromatic amines such as 2-amino-3-cyanothiophene, and derivatives thereof.

Examples of the aromatic ring containing C as a partial structure include aromatic amines such as 8-amino-7-hydroxy-2-naphthalenesulfonic acid, 2-hydroxyaniline, 2-hydroxy-5-methylaniline, 2-hydroxy-5-methoxyaniline, 2-hydroxy-5-ethoxyaniline and 5-acetylamino-2-hydroxyaniline, etc. These aromatic amines may be obtained by subjecting a precursor having a hydroxyl moiety in the form of alkoxy which interacts with a metal to the aforementioned successive repetition of diazo formation and condensation, and then allowing a metal salt and a proper amine to act on the product so that the alkoxy group is converted to a hydroxyl group coordinated to metal.

Examples of the aromatic compound containing D as a partial structure include α-naphthol derivatives such as Shoelkoft acid, Videt acid, L acid, chromotropic acid, Nevile-Winter's acid and ε acid, amino-α-naphthol derivatives such as γ acid, phenyl γ acid, 3-sulfophenyl γ acid, 4-carboxyphenyl γ acid, RR acid, J acid, phenyl J acid, methyl J acid, di-J acid, carbonyl J acid, H acid, benzoyl H acid, phenylsulfonyl H acid, M acid, S acid, SS acid and K acid, β-naphthol derivatives such as R acid, G acid, Crocein acid, Schaffer's acid, F acid, oxynaphthoic acid and 3-hydroxy-1,8-naphthalic acid, amino-β-naphthol derivatives such as Boeniger acid, heterocyclic aromatic compounds such as 8-hydroxy-5-sulfoquinoline, etc. Preferred among these aromatic compounds are J acid, γ acid, RR acid, 4-carboxyphenyl gamma acid, and 3-sulfophenyl gamma acid.

In the dyestuff represented by the general formula (1) of the present invention, $R_1$ is preferably a hydrogen atom, alkyl group (normally having from 1 to 10 carbon atoms, preferably from 1 to 5 carbon atoms) which may be substituted, phenyl group which may be substituted, acyl group which may be substituted, sulfonyl group which may be substituted or triazinyl group which may be substituted, particularly hydrogen atom.

$R_2$ is preferably hydrogen atom, alkyl group (normally having from 1 to 10 carbon atoms, preferably from 1 to 5 carbon atoms) which may be substituted, phenyl group which may be substituted, acyl group which may be substituted, sulfonyl group which may be substituted or triazinyl group which may be substituted, more preferably alkyl group which may be substituted, phenyl group which may be substituted, acyl group which may be substituted, sulfonyl group which may be substituted or triazinyl group which may be substituted, particularly alkyl group or phenyl group which may be substituted. Further, these groups described as $R_2$ may have azo groups with which may be connected to dyestuff residues. As the combination of $R_1$ and $R_2$ there is preferably used a combination of hydrogen atom as $R_1$ and hydrogen atom, alkyl group or phenyl group which may be substituted as $R_2$, most preferably combination of hydrogen atom as $R_1$ and alkyl group or phenyl group which may be substituted as $R_2$.

In the aforementioned description, the substituents which $R_1$ and $R_2$ further have thereon are not specifically limited. In the case where the group to be substituted is an alkyl group, it is substituted by a substituent normally having from 1 to 10 carbon atoms, preferably from 1 to 5 carbon atoms. In the case where the group to be substituted is a group other than alkyl group, it is substituted by a substituent normally having from 1 to 15 carbon atoms, preferably from 1 to 10 carbon atoms.

Specific examples of $R_1$ and $R_2$ include methyl group, ethyl group, 2-hydroxyethyl group, 2-carboxyethyl group, phenyl group, 3-sulfophenyl group, 4-carboxyphenyl group, acetyl group, benzoyl group, 4-methylphenylsulfonyl group, 3-bis(2-hydroxyethyl)amino-5-(2-sulfoethyl)amino-2,4,6-triazino group, etc. in addition to hydrogen atom.

As m, n, p and q there may be used arbitrary numbers falling within the aforementioned range. It is particularly preferred that m be 0, n be 1 or 2 and p be 1. In particular, q is preferably 1, that is, the dyestuff of the general formula (1) is preferably a trisazo compound having three azo groups per molecule.

As M, too, there may be selected an arbitrary metal, preferably a divalent or trivalent transition metal such as copper, nickel, iron and cobalt.

The dyestuff of the present invention can be preferably used as a dyestuff for black recording liquid. In order to apply the dyestuff of the present invention to a recording liquid, it may be used in the form of free acid represented by the general formula (1). Alternatively, the acid group may be partially or entirely converted to a desired salt form before use. As the counter ion constituting the salt there may be used one or more ions selected from the group consisting of alkaline metal ions such as lithium, sodium and potassium ions, ammonium ion, and substituted amines. Specific examples of the substituted amines include mono-, di- and tri-substituted amines the substituent on which is alkyl group having from 1 to 4 carbon atoms and/or hydroxyalkyl group having from 1 to 4 carbon atoms. Different counter ions may be used in combination.

As the dyestuff represented by the general formula (1) or (1') to be used in the recording liquid of the present invention there may be exemplified as a preferred specific example a compound the A to D moieties of which are selected from the following groups and are combined with one another.

Examples of A include the structures represented by the following formulae (A-1) to (A-12). Preferred among these structures are (A-1), (A-6), (A-8) and (A-10).

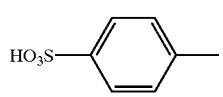
(A-1)

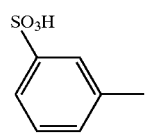
(A-2)

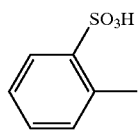
(A-3)

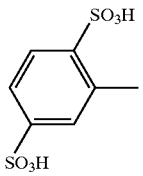
(A-4)

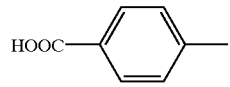
(A-5)

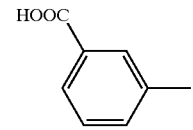
(A-6)

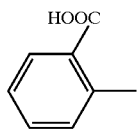
(A-7)

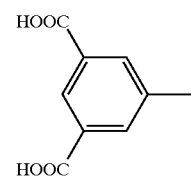
(A-8)

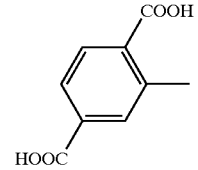
(A-9)

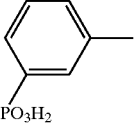
(A-10)

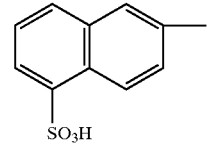
(A-11)

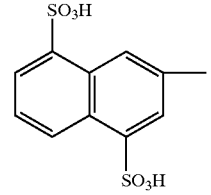
(A-12)

Examples of B include the structures represented by the following formulae (B-1) to (B-10). Preferred among these structures are (B-1), (B-3) and (B-8).

(B-1) 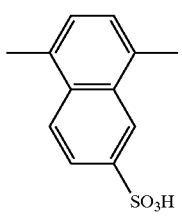

(B-2) 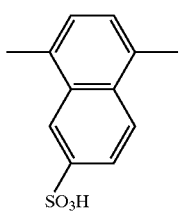

(B-3) 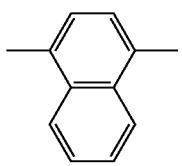

(B-4) 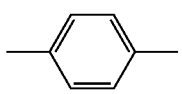

(B-5) 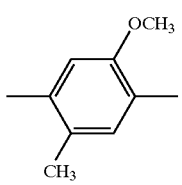

(B-6) 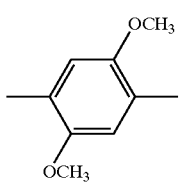

(B-7) 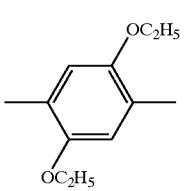

(B-8) 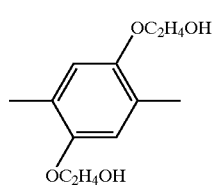

(B-9) 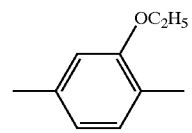

(B-10) 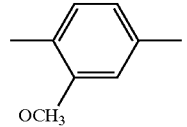

Examples of C include the structures represented by the following formulae (C-1) to (C-4). Preferred among these structures are (C-1) and (C-2).

(C-1) 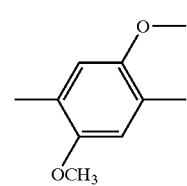

(C-2) 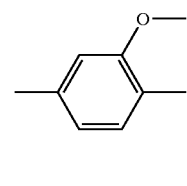

(C-3) 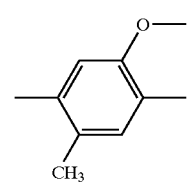

(C-4) 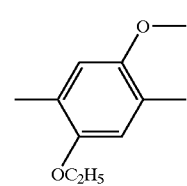

Examples of the aromatic compound having D as a partial structure include those represented by the following formulae (D-1) to (D-14). Preferred among these compounds are aromatic compounds represented by the formulae (D-1), (D-2), (D-7), (D-8) and (D-10).

(D-1) 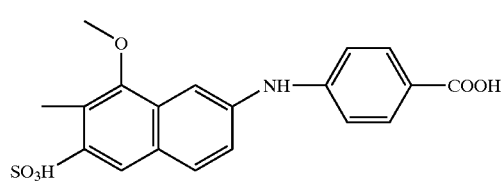
(D-2) 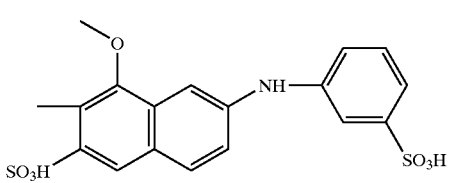
(D-3) 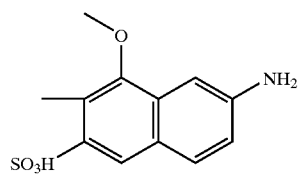
(D-4) 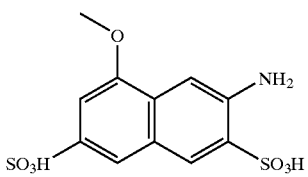
(D-5) 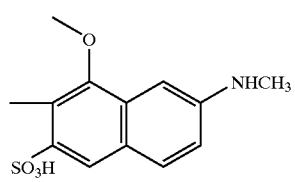
(D-6) 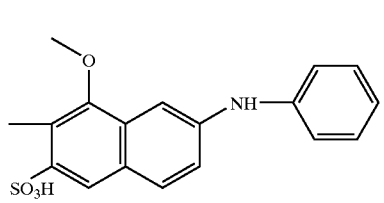
(D-7) 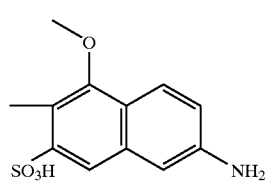
(D-8) 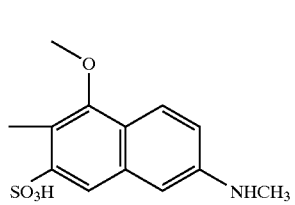
(D-9) 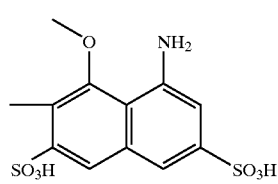
(D-10) 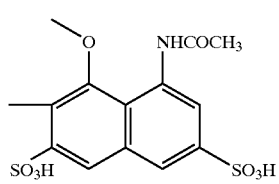
(D-11) 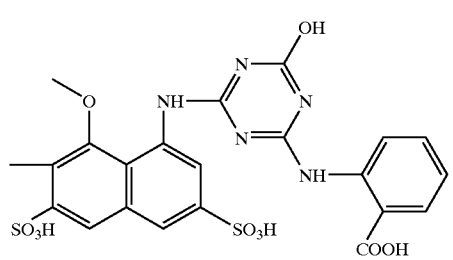
(D-12) 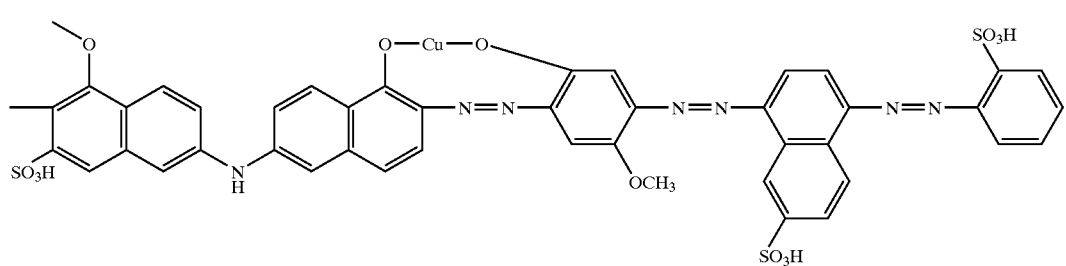

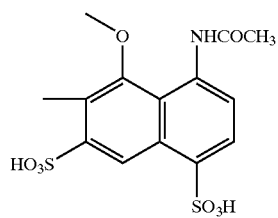 (D-13)
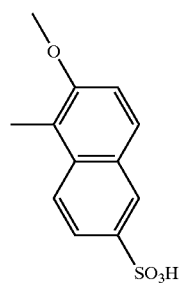 (D-14)
Still desirable specific examples of the dyestuff to be used in the recording liquid of the present invention will be shown in Table 1 below, but the present invention is not limited thereto.
TABLE 1
No. 1
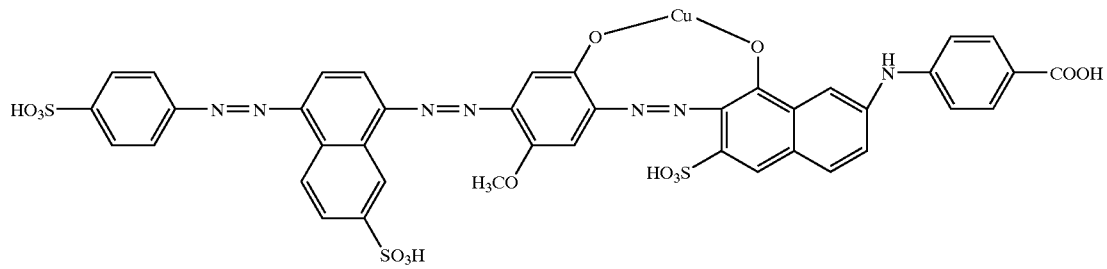
No. 2
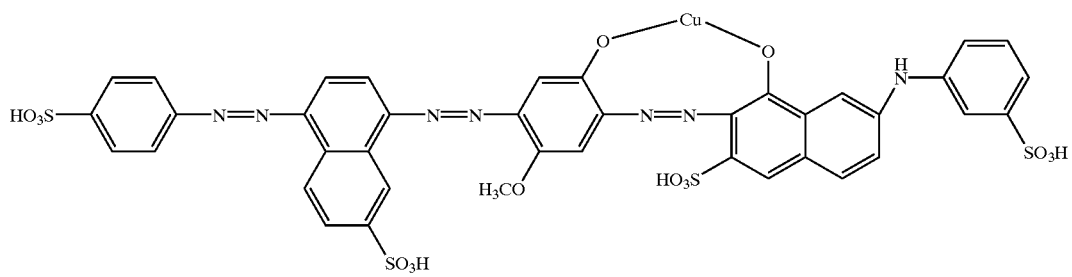
No. 3
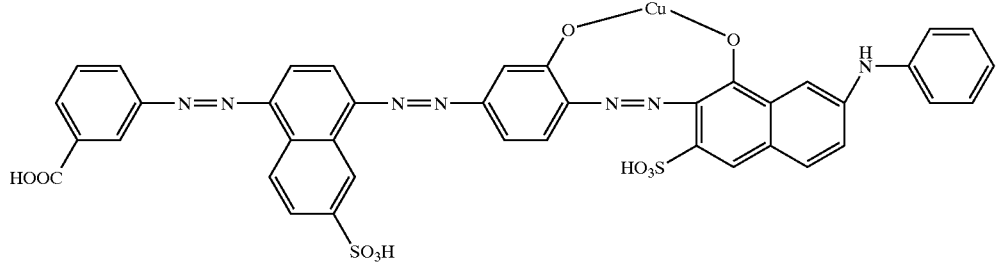
No. 4
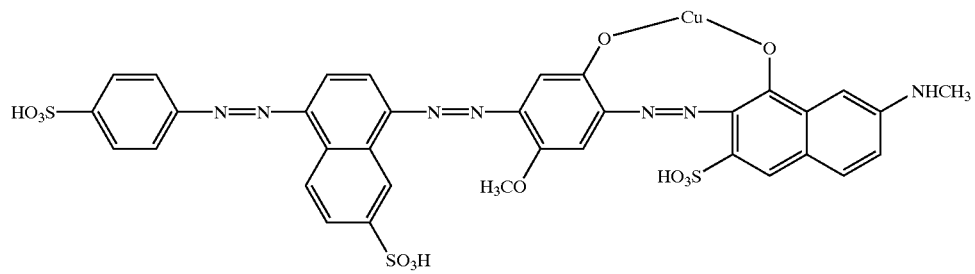

TABLE 1-continued
No. 5
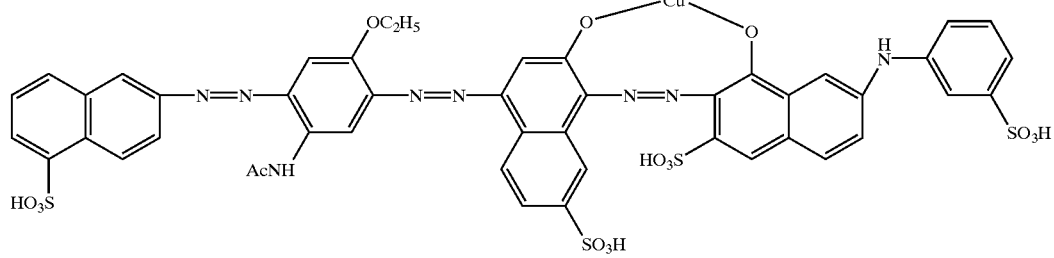
No. 6
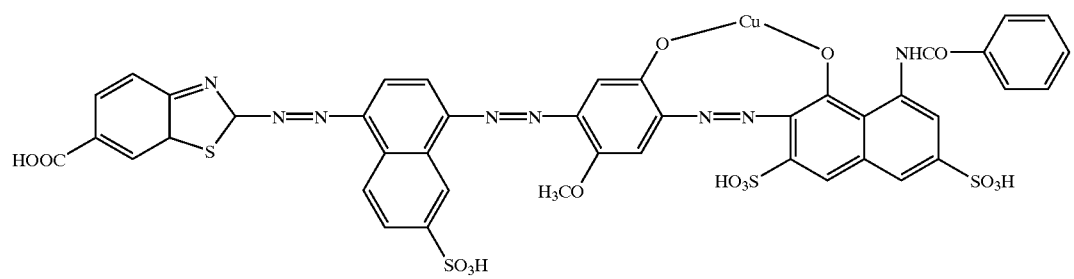
No. 7
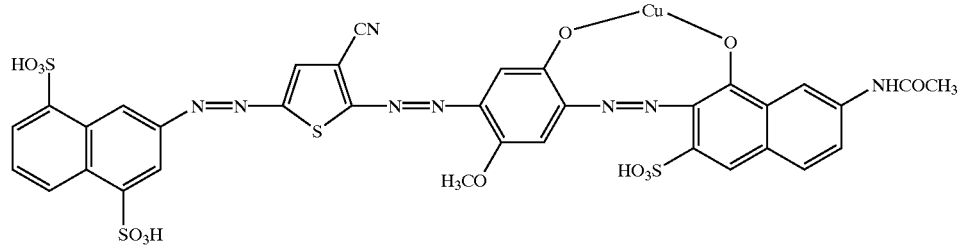
No. 8
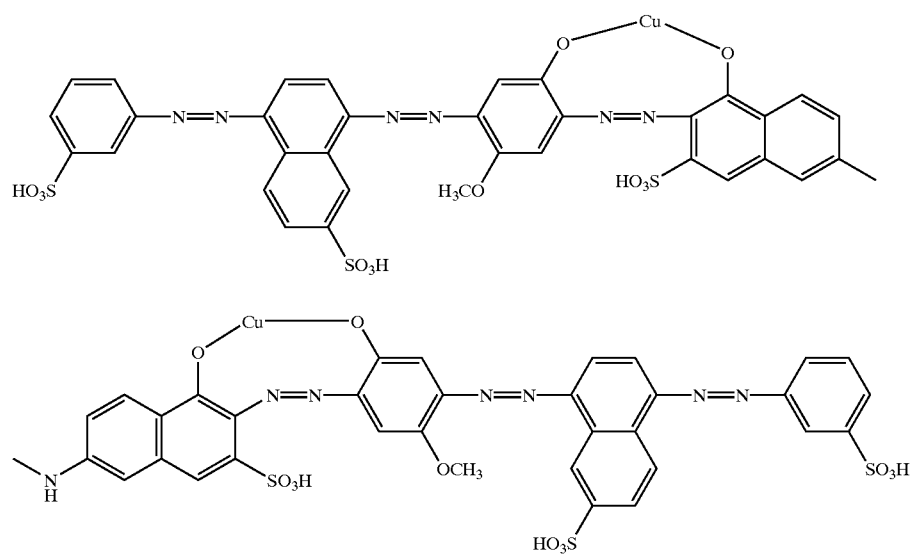

TABLE 1-continued
No. 9
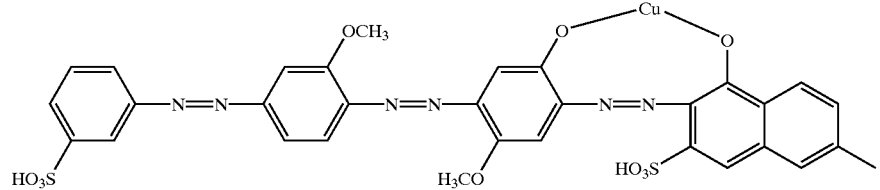
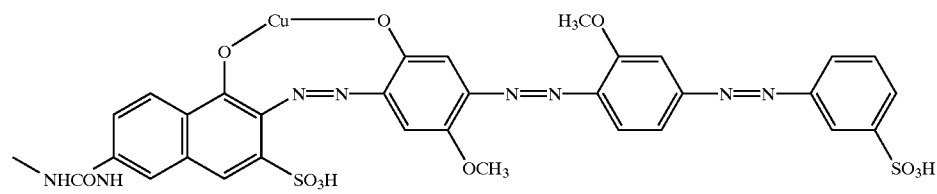
No. 10
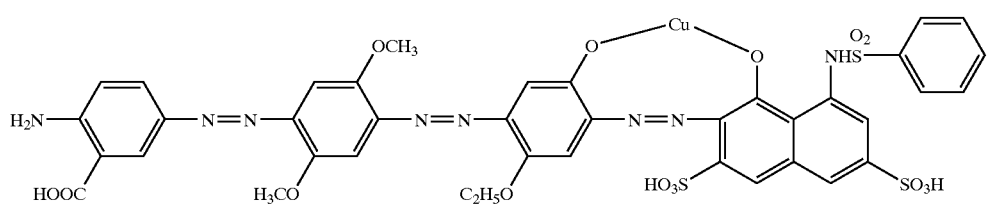
No. 11
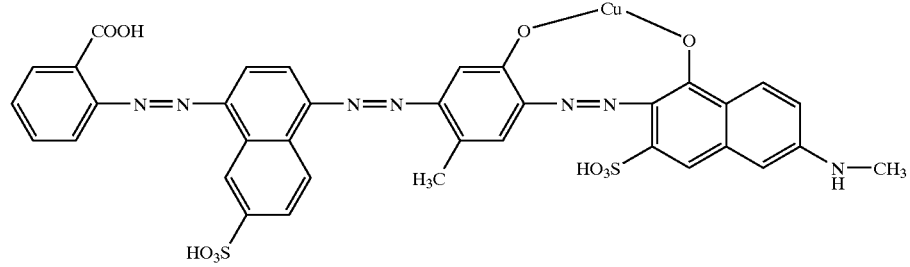
No. 12
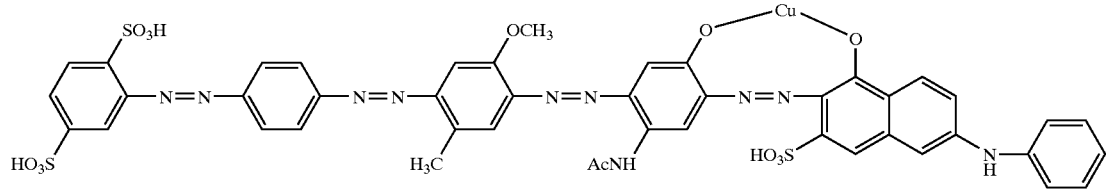
No. 13
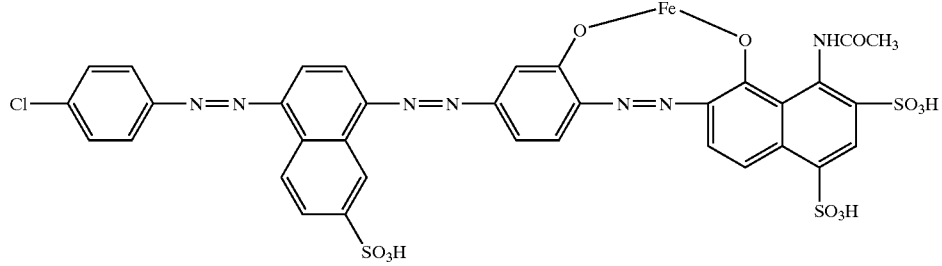

TABLE 1-continued
No. 14
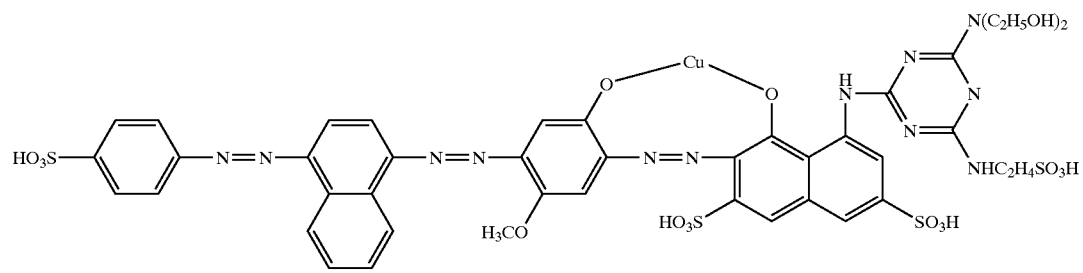
No. 15
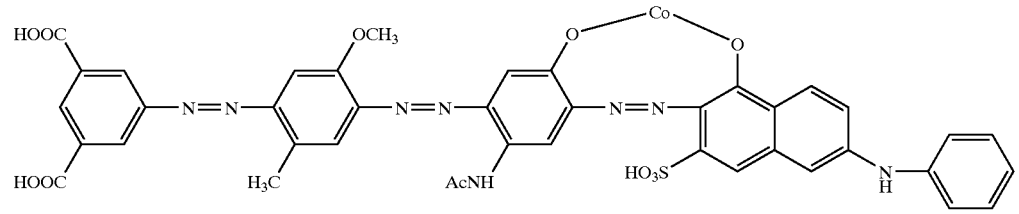
No. 16
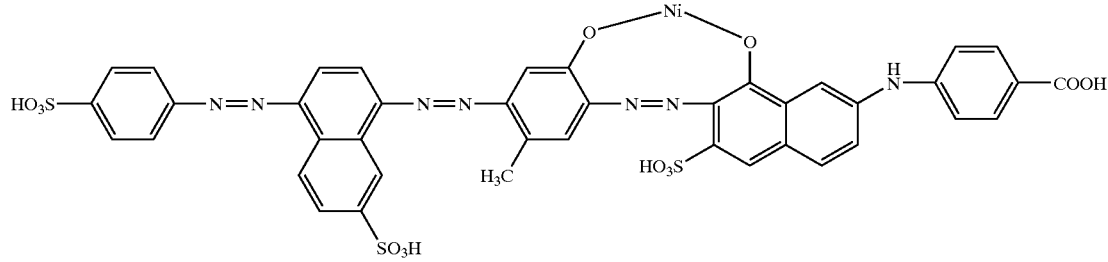
No. 17
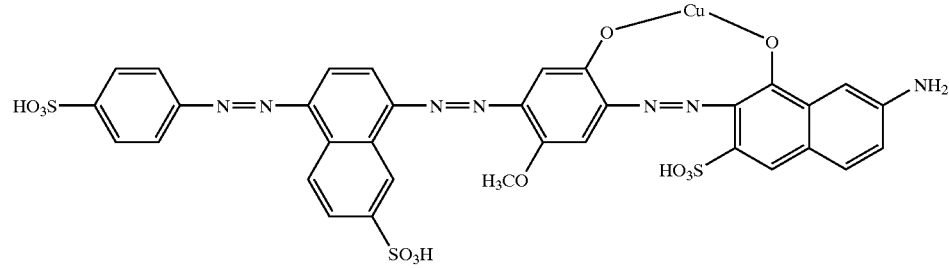
No. 18
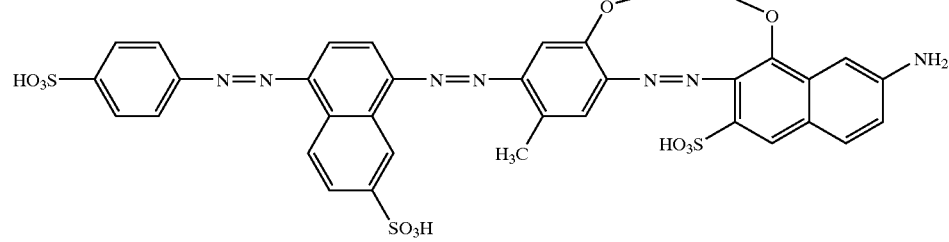
No. 19
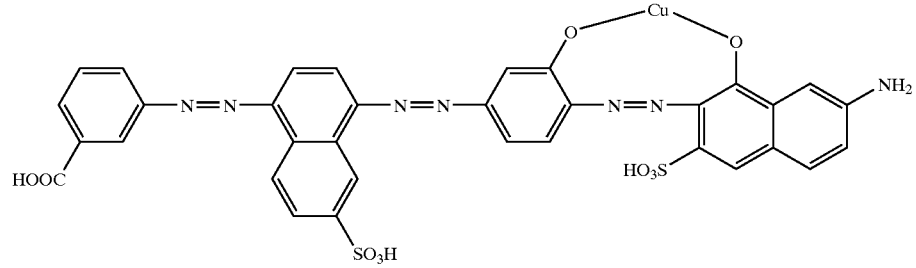

TABLE 1-continued
No. 20
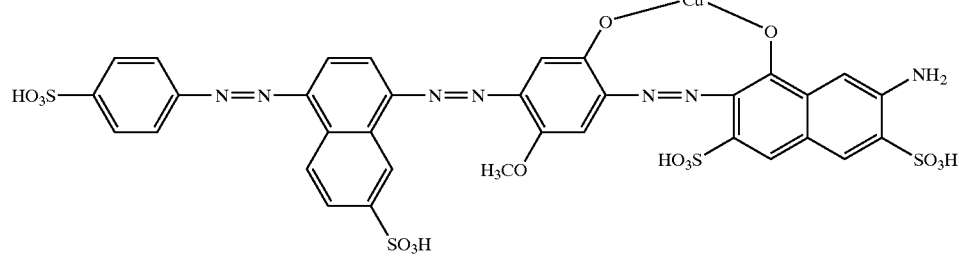
No. 21
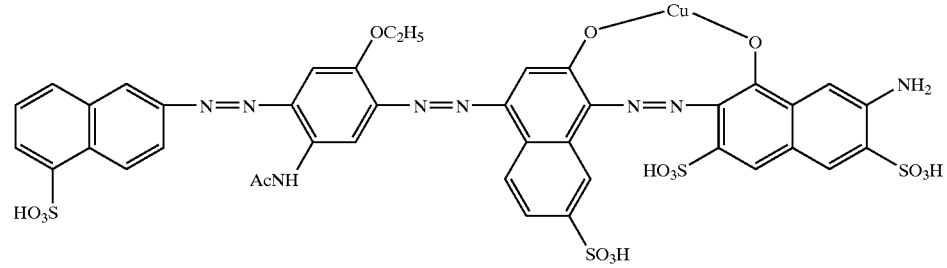
No. 22
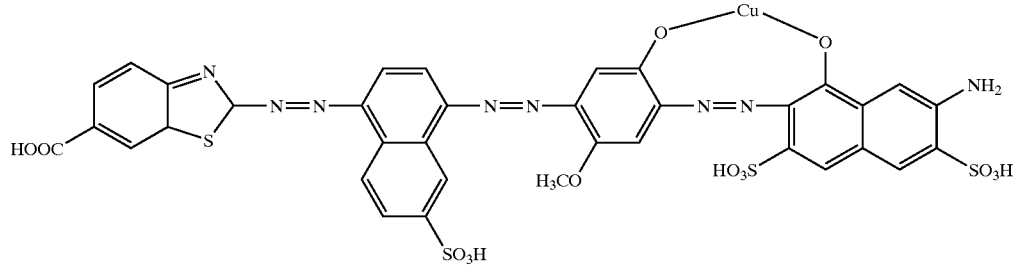
No. 23
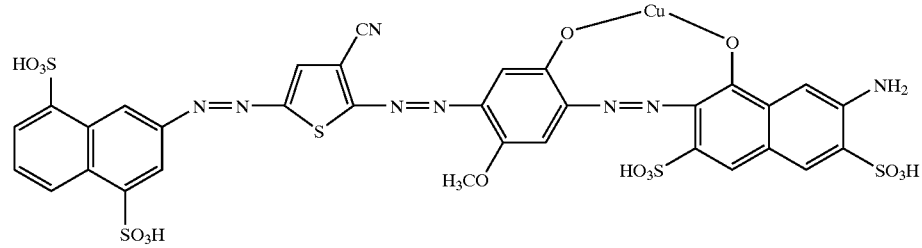
No. 24
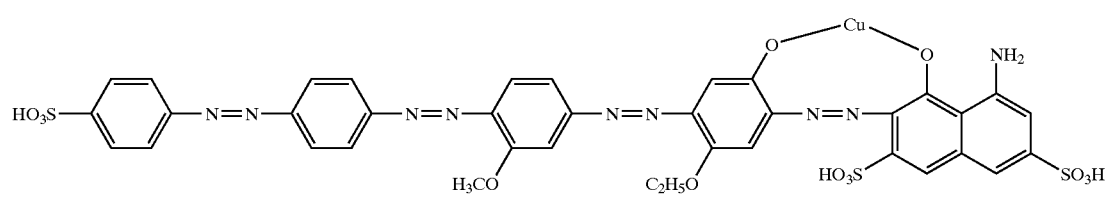
No. 25
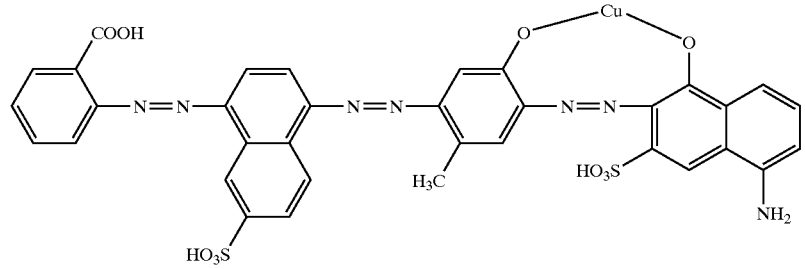

TABLE 1-continued
No. 26
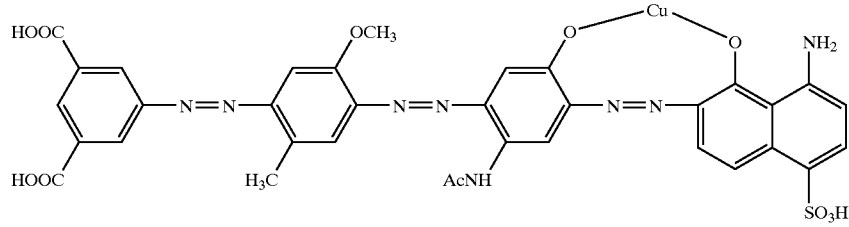
No. 27
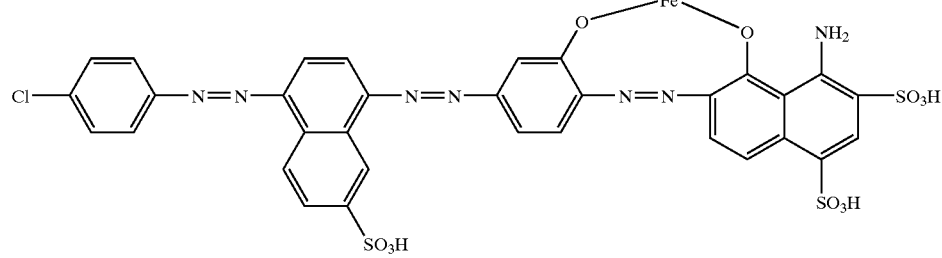
No. 28
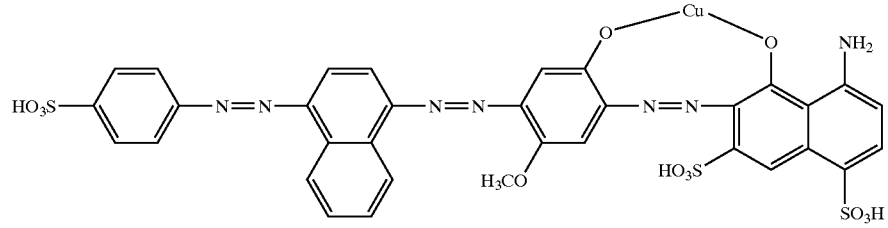
No. 29
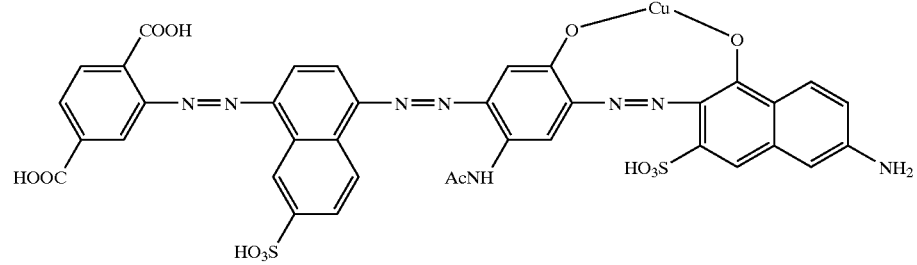
No. 30
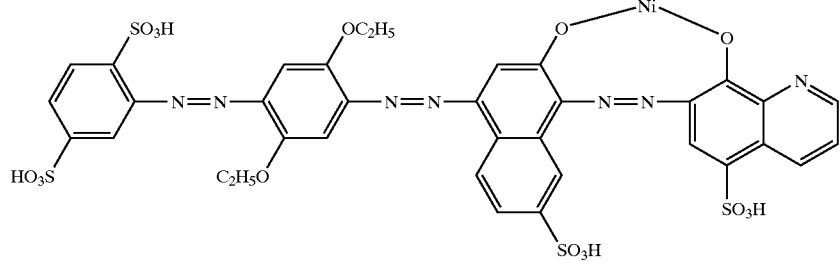
No. 31
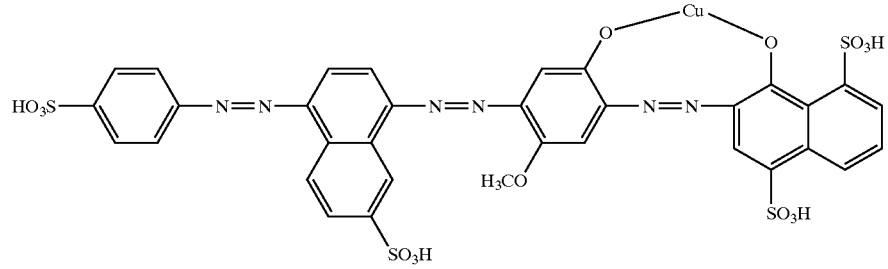

TABLE 1-continued
No. 32
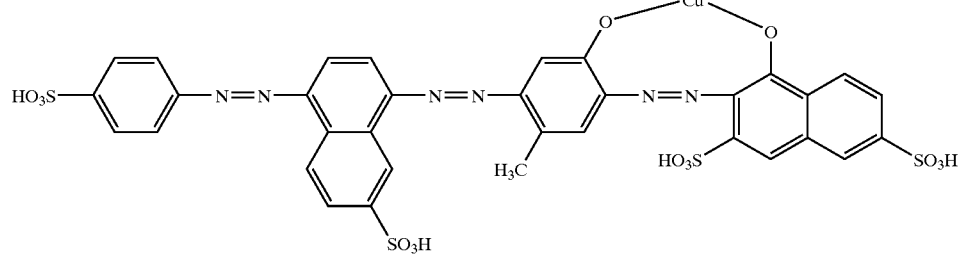
No. 33
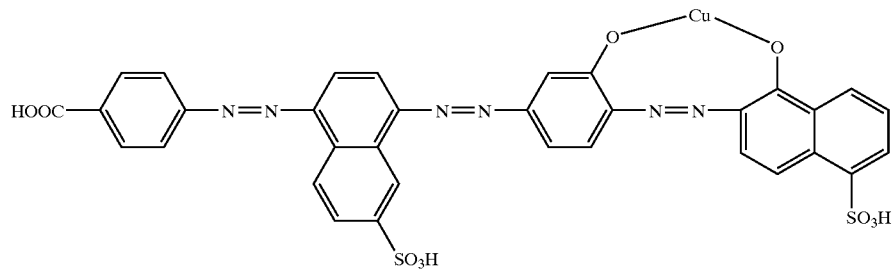
No. 34
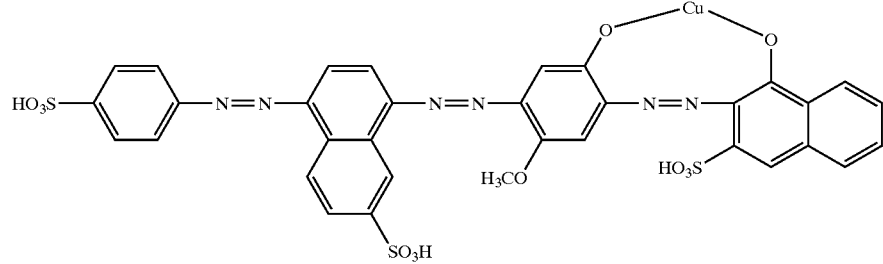
No. 35
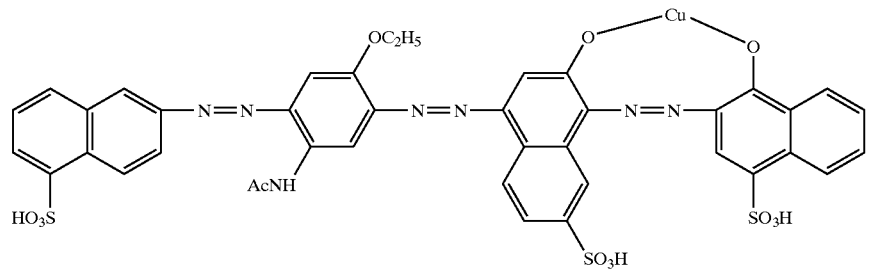
No. 36
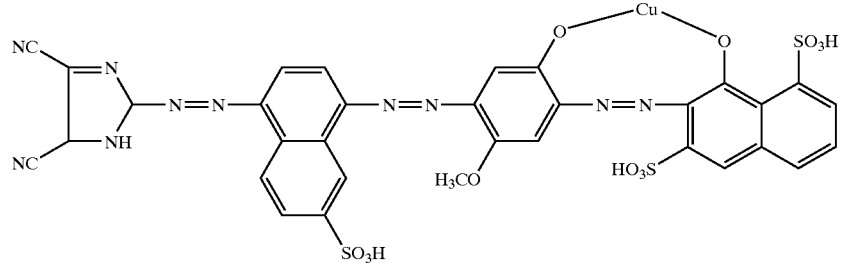

TABLE 1-continued
No. 37
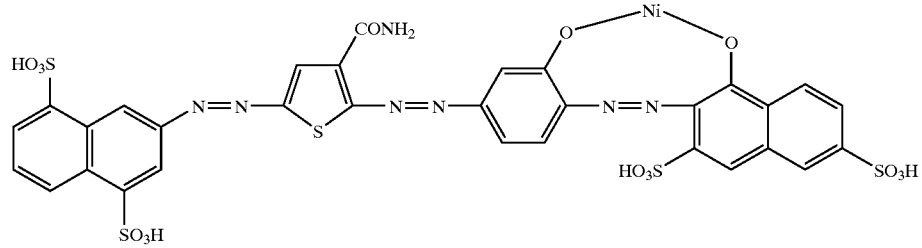
No. 38
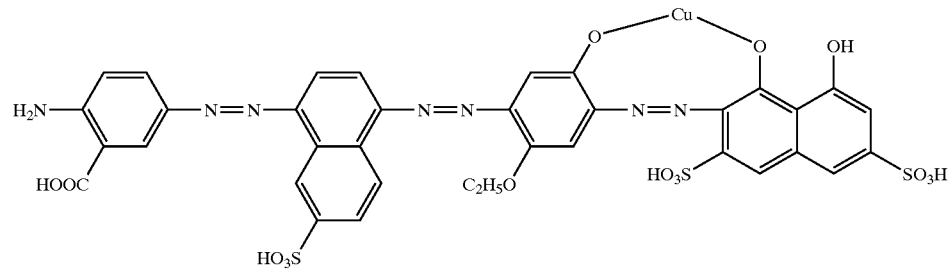
No. 39
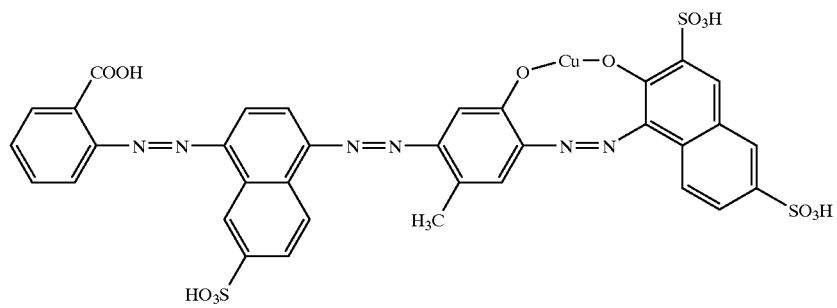
No. 40
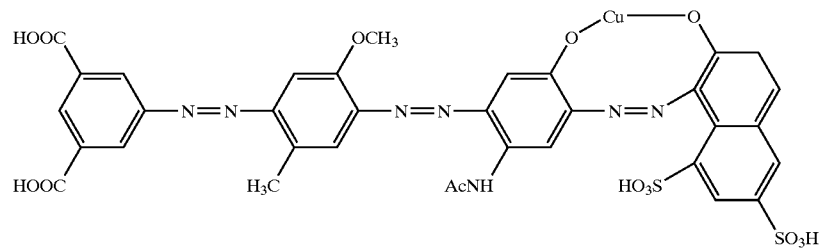
No. 41
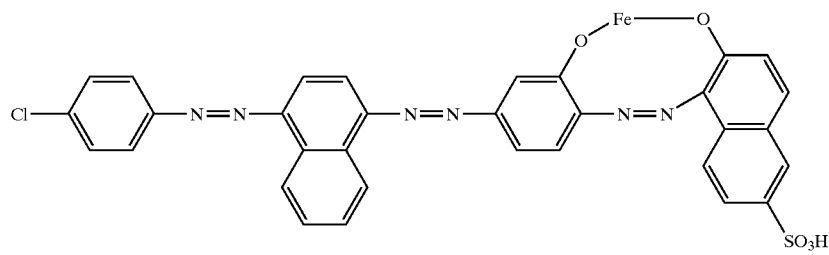

TABLE 1-continued
No. 42
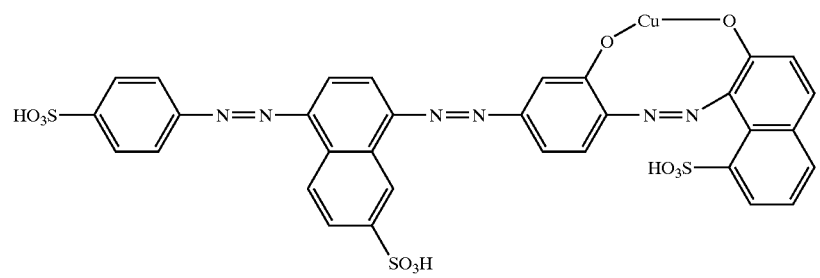
No. 43
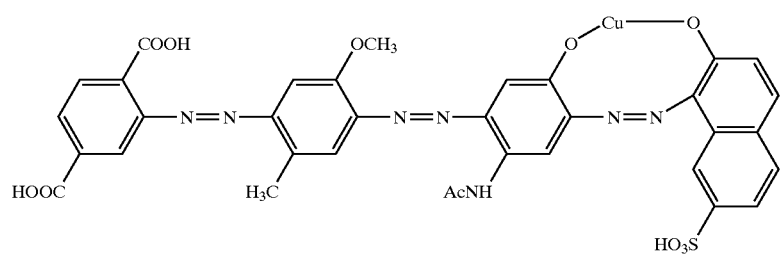
No. 44
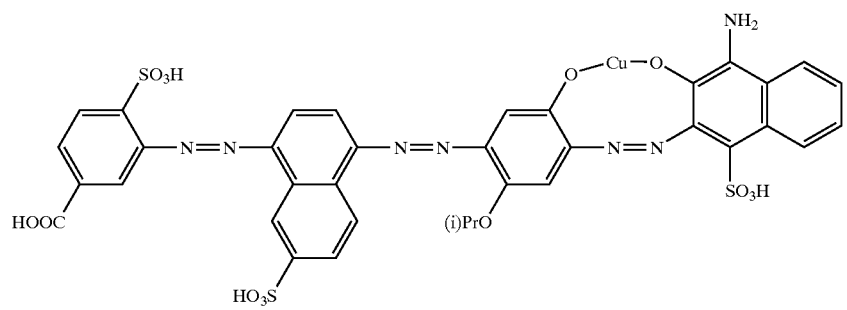
No. 45
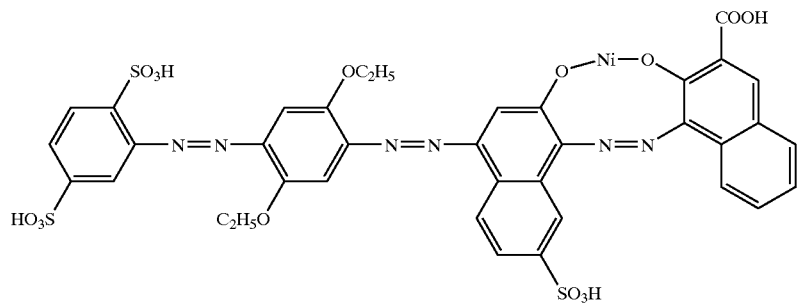
No. 46
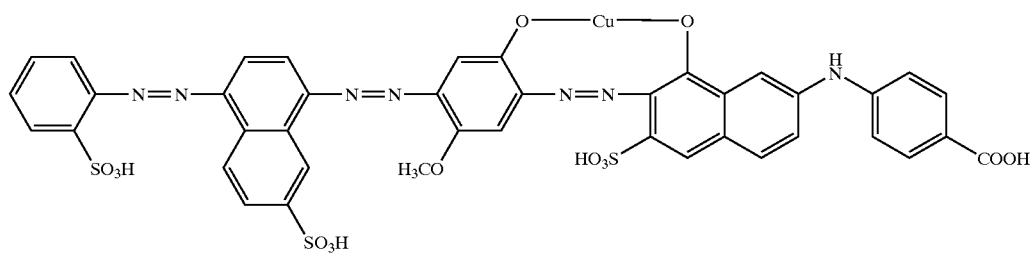

TABLE 1-continued
No. 47
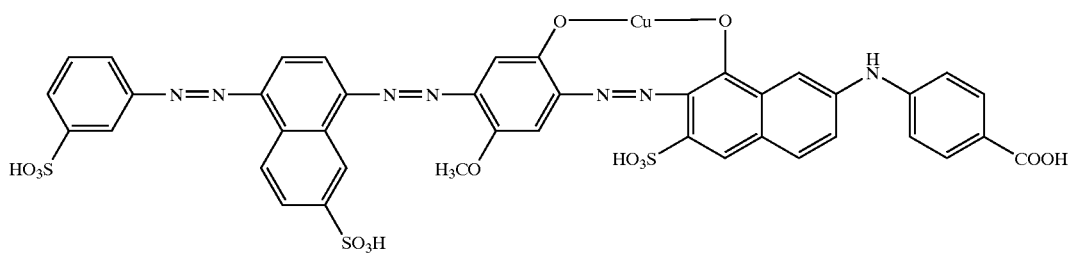
No. 48
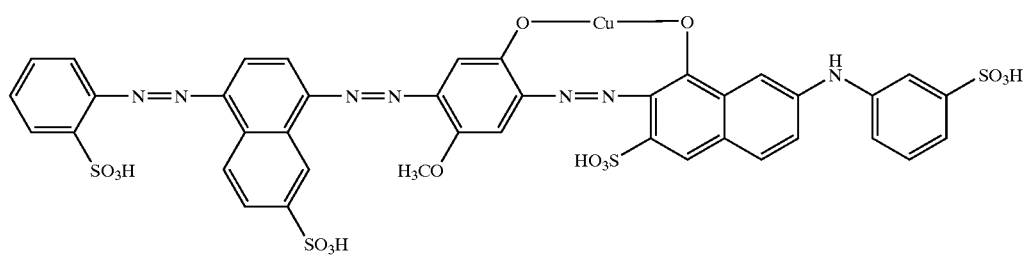
No. 49
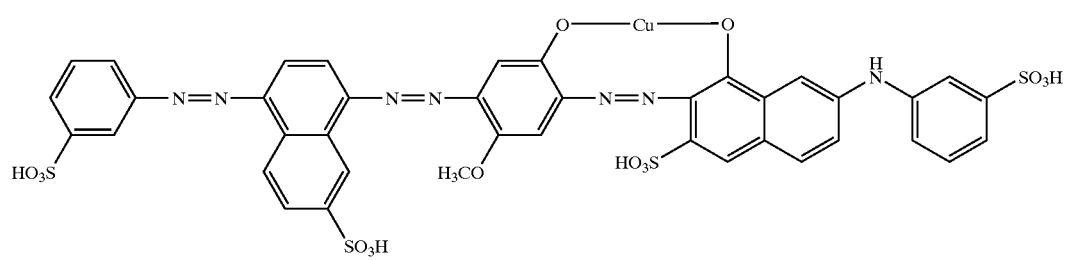
No. 50
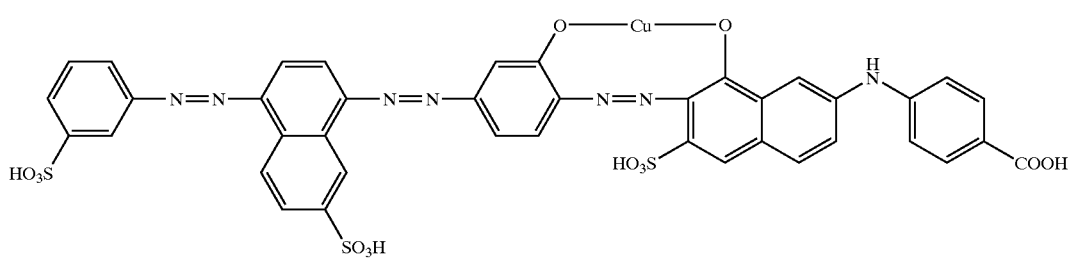
No. 51
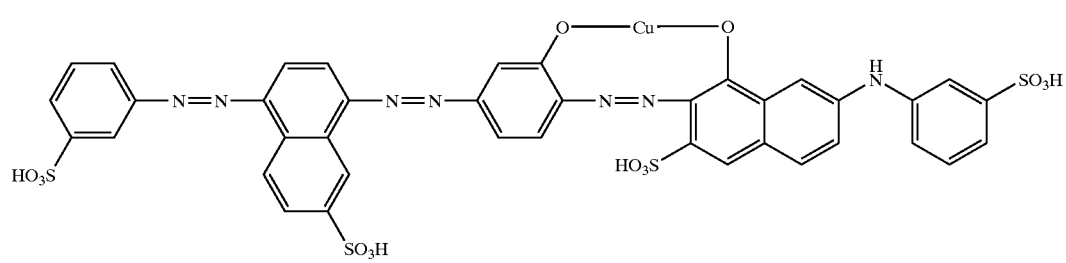
No. 52
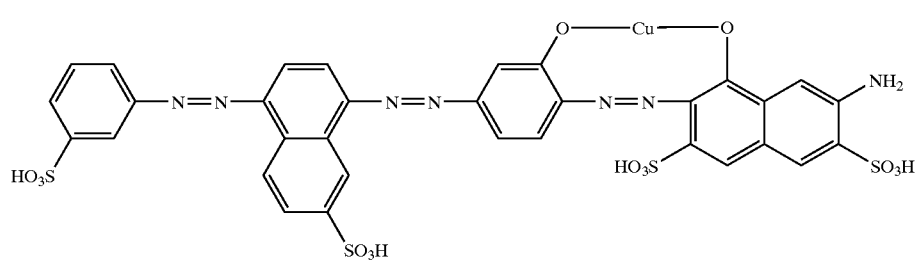

TABLE 1-continued

No. 53
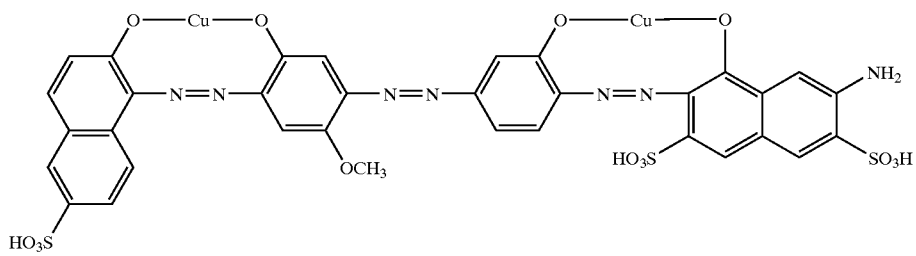

The recording liquid or recording liquid for inkjet of the present invention contains an aqueous medium and at least one metal chelated azo dyestuff represented by the general formula (1) or salt thereof. Two or more of the compounds represented by the general formula (1) may be used in combination in the recording liquid. The content of the dyestuff of the general formula (1) in the inkjet recording liquid is preferably from about 0.5% to 10% by weight, particularly from about 2% to 7% by weight based on the total weight of the recording liquid.

The black metal chelated azo dyestuff the free acid form of which is represented by the aforementioned general formula (1) gives a desirable achromaticity itself but may be slightly bluish, greenish, reddish or purplish. In order to further improve the achromaticity, other water soluble dyestuffs (hereinafter referred to as "complementary dyestuffs") can be further used as complementary components to prepare recording liquid, thereby obtaining a printed image having a more proper tone and a desirable light-fastness in the present invention.

Further, in the present invention, even when the recording liquid further containing the aforementioned complementary dyestuffs comprises as a black metal chelated azo dyestuff a dyestuff represented by the aforementioned general formula (1) wherein q is 0, a printed image having a proper tone and a desirable light-fastness can be obtained. In the specification of the present application, the black metal chelated azo dyestuff which is a disazo compound wherein q is 0 or a polyazo compound having more azo groups is defined by the aforementioned general formula (8). Accordingly, the dyestuff represented by the general formula (8) is the same as the aforementioned general formula (1) except that it includes those of the general formula (1) wherein q is 0. In other words, $M_1, A_1, B_1, C_1, D_1, m_1, n_1$ and $p_1$ in the general formula (8) have the same meaning as that of M, A, B, C, D, m, n and p in the general formula (1). This applies also to specific preferred examples. Further, $R_{13}$ and $R_{14}$ in the general formula (8) have the same meaning as $R_1$ and $R_2$ in the general formula (1). This applies also to specific preferred examples. $q_1$ preferably indicates an integer of from 1 to 3, more preferably 1.

As the complementary dyestuff to be used in the aforementioned recording liquid for inkjet there may be used a water soluble dyestuff which can be generally used as an inkjet recording dyestuff without any restriction so far as the effect of the present invention can be exerted. Azo dyestuffs and non-azo dyestuffs may be used. Preferred among these dyestuffs are azo dyestuffs. The black metal chelated azo dyestuff to be used in the present application may be present in the form of azo dyestuff which is not fully complexed due to its properties. However, in the present application, the incorporation of a water soluble dyestuff for toning in addition to the black metal chelated azo dyestuff is included in the scope of the present invention. As such a water soluble dyestuff for toning there is preferably used a dyestuff which is not in the form of metal complex besides the metal complex dyestuff. As far as the metal complex of the present invention has properties such as sufficient light-fastness, the auxiliary use of a small amount of a water soluble dyestuff which is not in the form of metal complex makes it possible to obtain sufficient properties.

Examples of the azo dyestuff among the dyestuffs to be used as complementary dyestuff of the present invention include monoazo dyestuff, disazo dyestuff, trisazo dyestuff, etc. The skeleton of the azo dyestuff to be used as complementary dyestuff may be the same as or different from that of the general formula (8), preferably different from that of the general formula (8). The aromatic ring constituting these dyestuffs may have heteroatoms. In some detail, dyestuffs having a basic skeleton set forth in Table 2 below, etc. are preferably used. R in the general formulae in Table 2 each indicates a hydrogen atom, halogen atom or any other arbitrary substituent or may be a substituent including the dyestuff structure in the respective general formula. In the case where there are a plurality of R's in the general formulae, they may be the same or different.

TABLE 2

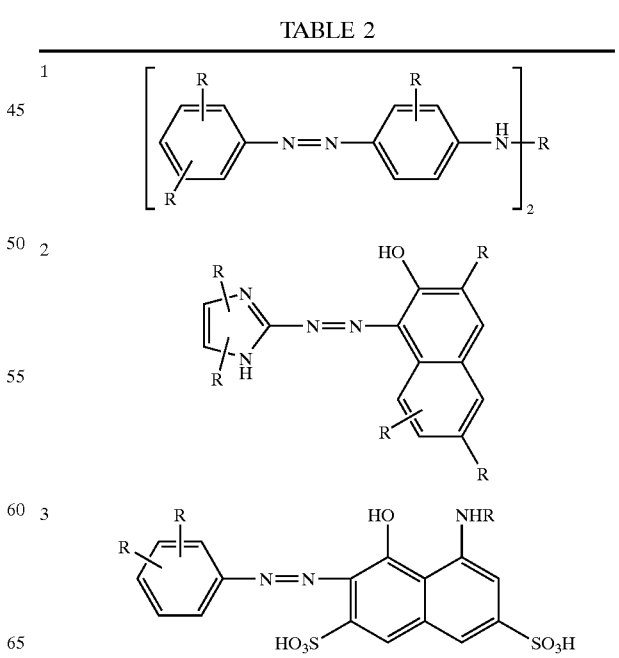

TABLE 2-continued

4
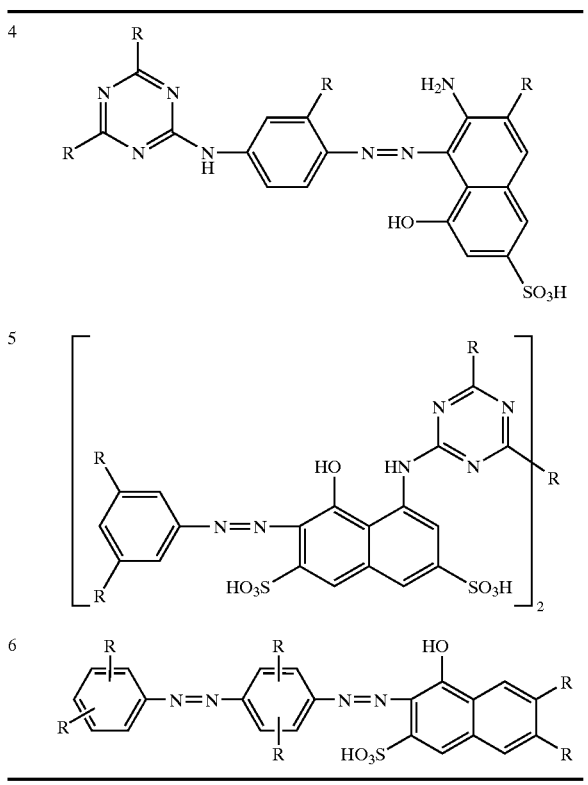

5
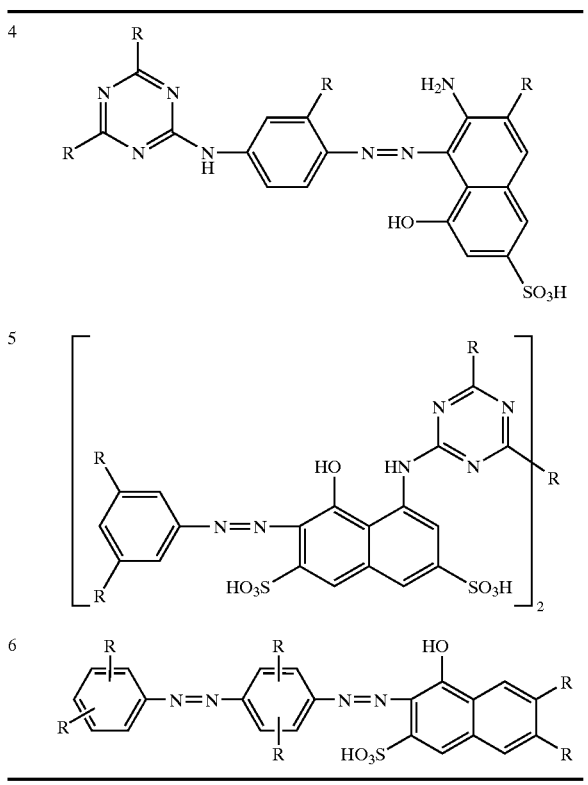

6
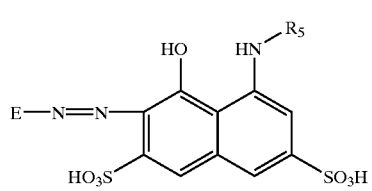

More specifically, as the complementary dyestuff there is preferably used, e.g., a water soluble dyestuff the free acid form of which is represented by any of the following general formulae (2) to (5):

(2)
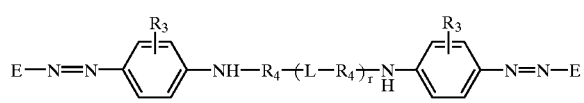

(wherein E represents phenyl group which may be substituted or naphthyl group which may be substituted; $R_3$ represents hydrogen atom, halogen atom, alkyl group having from 1 to 4 carbon atoms, alkoxy group having from 1 to 4 carbon atoms, carboxyl group or sulfonic acid group; $R_4$ represents carbonyl group or triazinyl group which may be substituted; L represents an arbitrary connecting group; and r represents 0 or 1, with the proviso that a plurality of E's, $R_3$'s and $R_4$' which are present in the molecule each may be the same or different), (3)
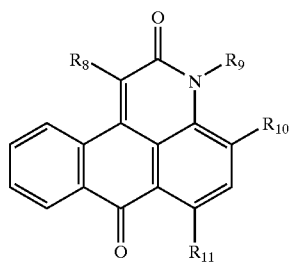

(wherein $R_5$ represents hydrogen atom, alkyl group having from 1 to 4 carbon atoms, acyl group or triazinyl group which may be substituted; and E represents phenyl group which may be substituted or naphthyl group which may be substituted), (4)
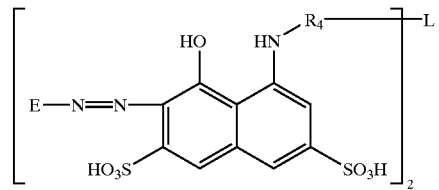

(wherein E represents phenyl group which may be substituted or naphthyl group which may be substituted; $R_4$ represents carbonyl group or triazinyl group which may be substituted; and L represents an arbitrary connecting group), (5)
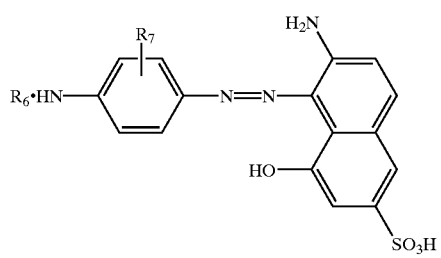

(wherein $R_6$ represents triazinyl group which may be substituted; and $R_7$ represents hydrogen atom, halogen atom, alkyl group having from 1 to 4 carbon atoms, alkoxy group having from 1 to 4 carbon atoms, carboxyl group or sulfonic acid group).

Examples of the non-azo dyestuff among the complementary dyestuffs include condensed ring compounds such as dioxazine-based, anthraquinone-based, xanthene-based, anthrapyridone-based and metal phthalocyanine-based condensed ring compounds. As the complementary dyestuff there may be used a metal chelated dyestuff other than metal chelated dyestuff of the present invention, preferably metal chelated azo dyestuff.

Specific examples of the anthrapyridone-based dyestuff include an anthrapyridone-based water soluble dyestuff the free acid form of which is represented by the following general formula (6):

(6)
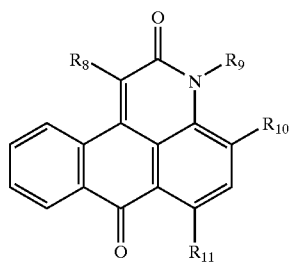

wherein in the general formula (6) $R_8$ represents hydrogen atom, halogen atom, cyano group, alkyl group (preferably having from 1 to 6 carbon atoms, more preferably from 1 to 4 carbon atoms) which may be substituted, alkoxy group (preferably having from 1 to 6 carbon atoms, more preferably from 1 to 4 carbon atoms) which may be substituted, alkoxycarbonyl group (preferably having from 1 to 6 carbon atoms, more preferably from 1 to 4 carbon atoms) which may be substituted or acyl group which may be substituted; $R_9$ represents hydrogen atom, alkyl group (preferably having from 1 to 6 carbon atoms, more preferably from 1 to 4 carbon atoms) which may be substituted or alkoxy group (preferably having from 1 to 6 carbon atoms, more preferably from 1 to 4 carbon atoms) which may be substituted; $R_{10}$ represents hydrogen atom, alkyl group (preferably having from 1 to 6 carbon atoms, more preferably from 1 to 4 carbon atoms) which may be substituted, alkoxy group (preferably having from 1 to 6 carbon atoms, more preferably from 1 to 4 carbon atoms) which may be substituted or phenoxy group which may be substituted; and $R_{11}$ represents hydrogen atom, halogen atom, amino group which may be substituted or anilino group which may be substituted.

Specific examples of the aforementioned metal chelated azo dyestuff include a metal chelated azo dyestuff formed by an azo compound the free acid form of which is represented by the following general formula (7) and a metal element:

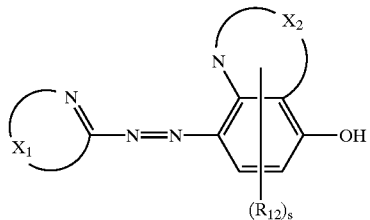

(7)

wherein in the general formula (7) $X_1$ and $X_2$ each independently represents a plurality of atoms required to form at least one 5- to 7-membered aromatic ring, with the proviso that the aromatic rings containing $X_1$ or $X_2$ each may have substituents, the substituents on the aromatic rings may be further condensed to form condensed rings and the aromatic rings containing $X_1$ or $X_2$ may contain heteroatoms; $R_{12}$ represents hydroxyl group, carboxyl group, sulfonic acid group, phosphono group, alkyl group (preferably having from 1 to 6 carbon atoms), alkoxy group (preferably having from 1 to 6 carbon atoms) or amino group which may be substituted; and s represents an integer of from 1 to 5, with the proviso that if there are a plurality of $R_{12}$'s, they may be the same or different.

As the metal element which forms a chelate with the aforementioned azo compound there is preferably used a divalent or trivalent transition metal, more preferably copper, nickel, iron or cobalt, particularly copper or nickel.

As the metal in the metal phthalocyanine dyestuff there may be used a divalent or trivalent metal, preferably divalent or trivalent transition metal, more preferably copper, nickel, iron or cobalt, particularly copper or nickel.

In the general formulae (3) to (7), the substituent which may be substituted is not specifically limited but is a substituent which may be substituted by a substituent preferably having from 1 to 20 carbon atoms, more preferably from 1 to 15 carbon atoms. In the general formulae (3) to (7), the substituent which may be substituted is preferably one having from 1 to 6, preferably from 2 to 6 hydrophilic groups such as carboxyl group, sulfonic acid group and phosphono group per dyestuff molecule.

Specific examples of the aforementioned complementary dyestuff include C. I. Acid Yellow 17:1, C. I. Acid Yellow 23, C. I. Acid Yellow 49, C. I. Acid Yellow 65, C. I. Acid Yellow 104, C. I. Acid Yellow 155, C. I. Acid Yellow 183, C. I. Acid Yellow 194, C. I. Direct Yellow 86, C. I. Direct Yellow 106, C. I. Direct Yellow 132, C. I. Direct Yellow 142, C. I. Direct Yellow 173, D. I. Direct Yellow 194, C. I. Acid Red 8, C. I. Acid Red 37, C. I. Acid Red 50, C. I. Acid Red 51, C. I. Acid Red 52, C. I. Acid Red 87, C. I. Acid Red 92, C. I. Acid Red 93, C. I. Acid Red 95, C. I. Acid Red 98, C. I. Acid Red 287, C. I. Acid Red 35, C. I. Reactive Red 23, C. I. Reactive Red 180, hydrolyzate of C. I. Reactive Red 180, C. I. Direct Violet 107, C. I. Acid Blue 9, C. I. Hood Black 2, C. I. Direct Black 19, C. I. Direct Black 154, C. I. Direct Black 195, C. I. Direct Black 200, C. I. Direct Blue 86, C. I. Direct Blue 199, and dyestuffs the free acid form of which is represented by the structural formula exemplified in Table 3.

TABLE 3

No. 1

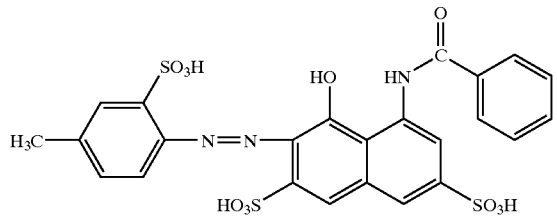

No. 2

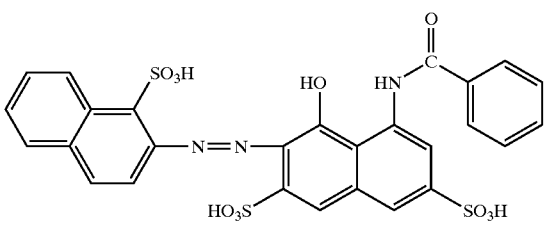

TABLE 3-continued
No. 3
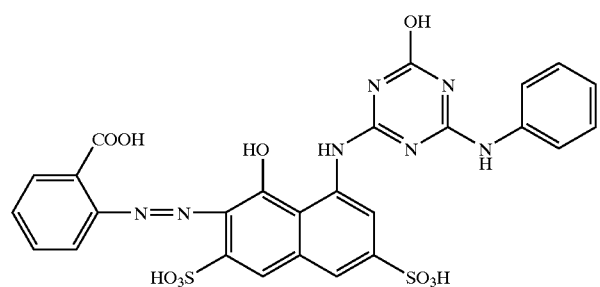
No. 4
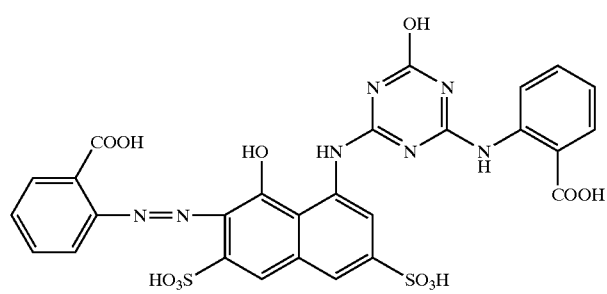
No. 5
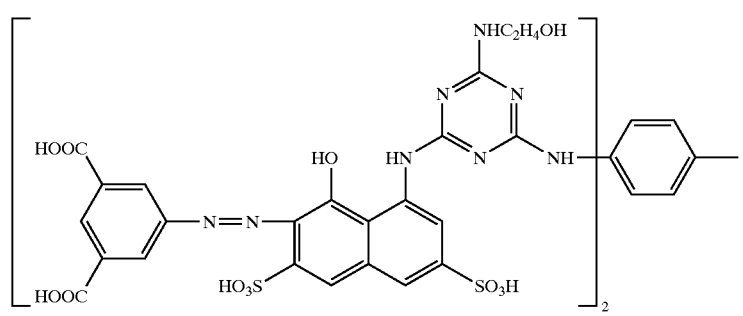
No. 6
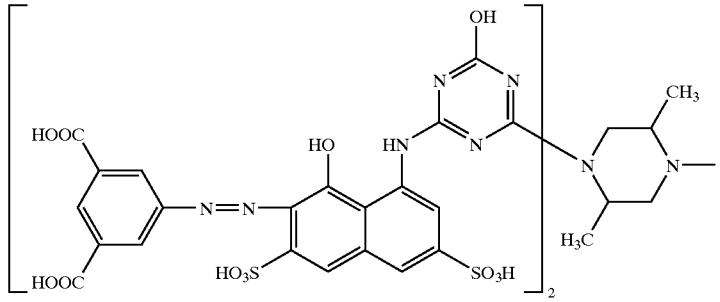
No. 7
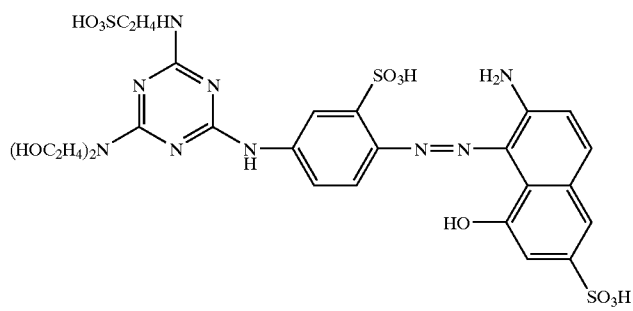

TABLE 3-continued
No. 8
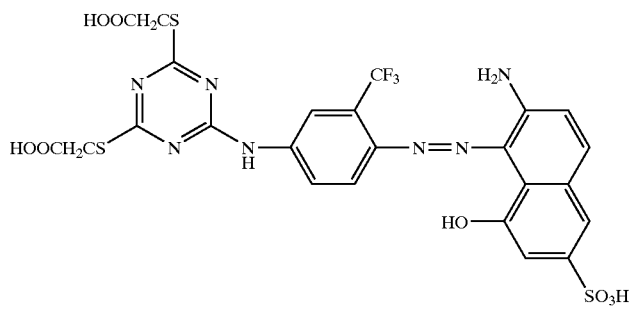
No. 9
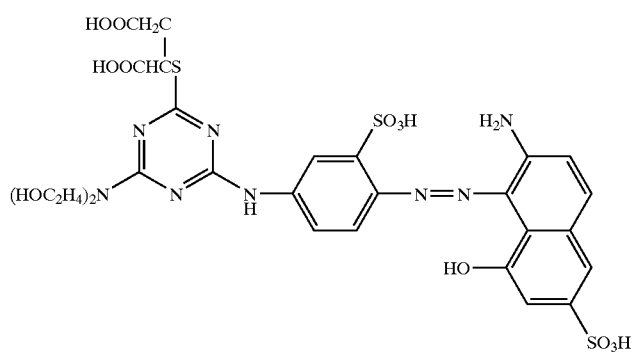
No. 10
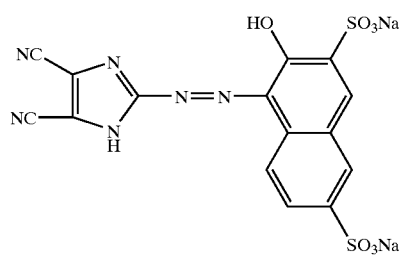
No. 11
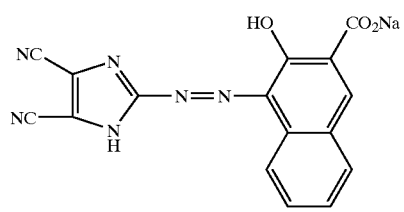
No. 12
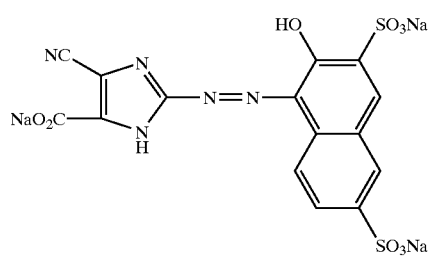

TABLE 3-continued
No. 13 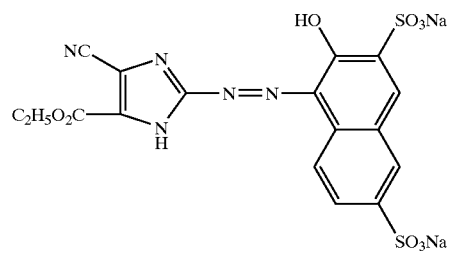
No. 14 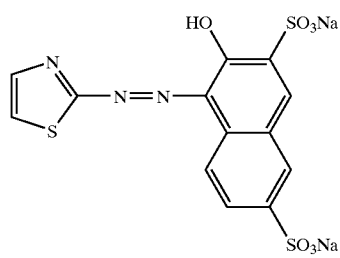
No. 15 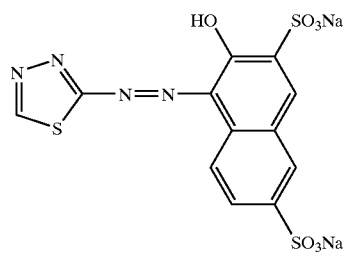
No. 16 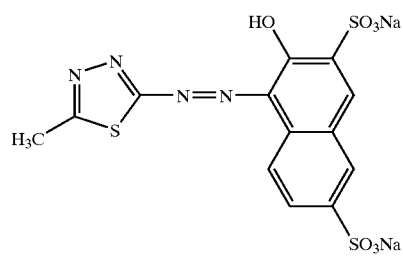
No. 17 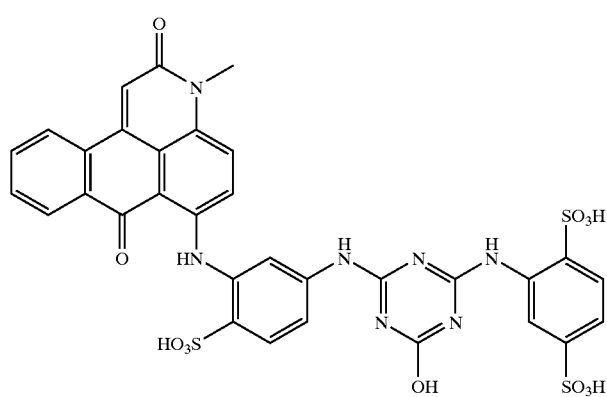

TABLE 3-continued

No. 18

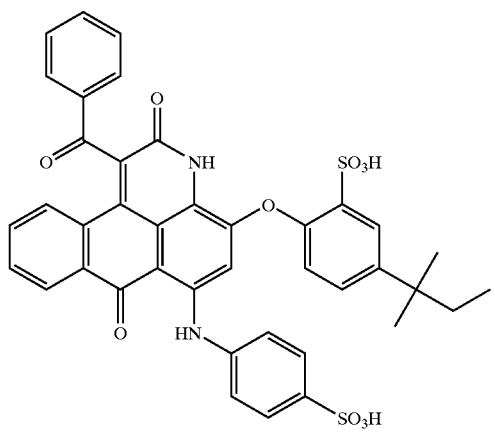

No. 19

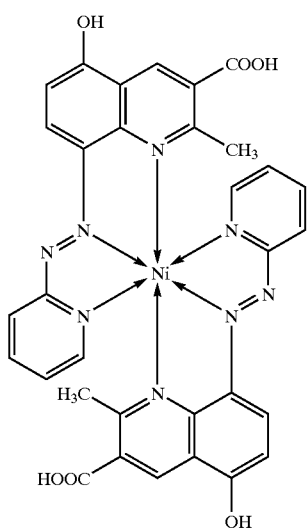

In order to prepare the recording liquid of the present invention, the black metal chelated azo dyestuff represented by the general formula (8) and the complementary dyestuff may be used in the form of free acid. However, the acid group may be partially or entirely converted to a desired salt form before use. As the counter ion constituting the salt there may be used one or more ions selected from the group consisting of alkaline metal ions such as lithium, sodium and potassium ions, ammonium ion, and substituted amines. Specific examples of the substituted amines include mono-, di- and tri-substituted amines the substituent on which is alkyl group having from 1 to 4 carbon atoms and/or hydroxyalkyl group having from 1 to 4 carbon atoms. Different counter ions may be used in combination.

The black metal chelated azo dyestuffs represented by the general formulae (2) to (8) and complementary dyestuffs each preferably have a molecular weight of not greater than 5,000, particularly not greater than 2,000.

The content of the dyestuff of the general formula (8) in the recording liquid of the present invention is preferably from 0.5% to 10% by weight, particularly from 2% to 7% by weight based on the total weight of the recording liquid, and the content of the other complementary dyestuffs in the recording liquid is preferably from 0.2% to 3% by weight, particularly from 0.5% to 2% by weight based on the total weight of the recording liquid. Referring to the weight proportion of the black dyestuff of the general formula (8) and the complementary dyestuff in the recording liquid, the proportion of the complementary dyestuff is preferably from 0.02 to 0.3, more preferably from 0.05 to 0.15 per black metal chelated azo dyestuff of the general formula (8).

In general, in order to improve the achromaticity of the black metal chelated azo dyestuff, the complementary dyestuff is used in a weight proportion of from 0.2 to 0.3 per black metal chelated azo dyestuff. In the case where black metal chelated azo dyestuffs having different hues are mixed for toning, the mixing ratio thereof may be 1:1. As previously mentioned, such a complementary processing have often led to the deterioration of light-fastness of the image obtained.

Nevertheless, the recording liquid of the present invention shows no deterioration of light-fastness even when subjected to toning. The presumable reason for this phenomenon is that the dyestuff represented by the aforementioned general formula (8) itself has a sufficiently improved light-fastness as compared with the conventional dyestuffs as well as a sufficiently improved achromaticity, exerting a synergistic effect with the resulting reduction of the amount of toning dyestuffs to be added to obtain a sufficiently good achromatic image from the conventional case.

The recording liquid preferably contains as a solvent water and a water soluble organic solvent such as ethylene glycol, propylene glycol, butylene glycol, diethylene glycol, triethylene glycol, polyethylene glycol (#200), polyethylene glycol (#400), glycerin, N-methylpyrrolidone, N-ethylpyrrolidone, 1,3-dimethylimidazolidinone, thiodiethanol, dimethyl sulfoxide, ethylene glycol monoallyl ether, ethylene glycol monomethyl ether, diethylene glycol monomethyl ether, 2-pyrrolidone, sulfolane, ethyl alcohol and isopropanol. These water soluble organic solvents are normally used in an amount of from 1 to 50% by weight based on the total amount of the recording liquid. On the other hand, water is used in an amount of from 45% to 95% by weight based on the total amount of the recording liquid.

The recording liquid of the present invention may contain a compound selected from the group consisting of urea, thiourea, biuret and semicarbazide incorporated therein in an amount of from 0.1% to 10% by weight, preferably from 2% to 8% by weight based on the total amount of the recording liquid or a surface active agent incorporated therein in an amount of from 0.001 to 5.0% by weight based on the total amount of the recording liquid to further improve the quick-drying properties of the b image which has been printed and the print quality.

The recording liquid of the present invention can be used for writing utensils or inkjet recording and is particularly suitable for inkjet recording. When recorded on ordinary paper, the recording liquid of the present invention can provide a black recorded matter having an excellent print density and fastness. The recording liquid of the present invention is excellent also in light-fastness on glossy paper and glossy film for use in photography, etc. The recording liquid of the present invention also has a good storage stability.

EXAMPLE

The present invention will be further described in the following examples, but the present invention is not limited thereto so far as it deviates from the subject matter thereof.

Dyestuff Nos. in the following examples correspond to Dyestuff Nos. set forth in the aforementioned Table 1. The term "parts" as used hereinafter is meant to indicate "parts by weight" unless otherwise specified.

Preparation Example 1

173 parts of sulfanilic acid were suspended in 1,700 parts of water. To the suspension were then added 260 parts of a 35% hydrochloric acid. The mixture was then cooled to a temperature of 0° C. To the mixture were then added 73 parts of sodium sulfite at a temperature of from 0° C. to 5° C. so that the sulfanilic acid was converted to diazo form. Thereafter, to the solution were added 5 parts of sulfamic acid to obtain a diazo solution of sulfanilic acid.

Separately, 245 parts of 1,7-Cleve's acid were dissolved in 6,000 parts of water. The solution was then cooled. To the solution was then added the aforementioned diazo solution of sulfanilic acid to produce a solid content which was then withdrawn by filtration. The solid content thus obtained was then suspended in 6,000 parts of water. The suspension was then adjusted with a 25% aqueous solution of caustic soda to pH 12 to obtain a uniform solution of monoazo compound.

To the monoazo compound solution were then added 73 parts of sodium sulfite to make a solution. The solution thus obtained was then added dropwise to 6,000 parts of water at a temperature of from 0° C. to 5° C. while the pH value thereof was being adjusted to 3 with a 35% hydrochloric acid so that the monoazo compound was converted to diazo form. To the solution were then added parts of sulfamic acid to obtain a diazo solution of monoazo compound.

Separately, 190 parts of 2,5-dimethoxyaniline hydrochloride were dissolved in 1,500 parts of water. The solution thus obtained was then cooled. To the solution was then added the aforementioned diazo solution of monoazo compound to produce a solid content which was then withdrawn by filtration. The solid content was then suspended in 6,000 parts of a 50% aqueous solution of NMP. The suspension thus obtained was then adjusted with a 25% aqueous solution of caustic soda to pH 12 to obtain a uniform solution of disazo compound.

To the disazo compound solution were then added 73 parts of sodium nitrite to make a solution. The solution thus obtained was then added dropwise to 6,000 parts of a 50% aqueous solution of N-methylpyrrolidone at a temperature of from 0° C. to 5° C. while the pH value thereof was being adjusted to 3 with a 35% hydrochloric acid so that the disazo compound was converted to diazo form. To the solution were then added 5 parts of sulfamic acid to obtain a diazo solution of disazo compound.

359 parts of 4-carboxyphenylgamma acid were suspended in 3,000 parts of water. The suspension thus obtained was then adjusted with caustic soda to pH 11 to obtain a uniform solution. The solution thus obtained was then cooled. To the solution was then added dropwise the aforementioned diazo solution of disazo compound at a temperature of from 0° C. to 5° C. to cause coupling. During the dropwise addition, the coupling bath was adjusted to a pH value of from 10 to 11 with a 25% aqueous solution of caustic soda. To the solution thus obtained were then added 900 parts of sodium chloride. The resulting crystal was withdrawn by filtration, and then dried.

66 parts of the trisazo compound thus obtained were then dissolved in 700 parts of water. To the solution were then added 24 parts of anhydrous copper sulfate and 61 parts of diethanolamine. The mixture was heated to a temperature of from 95° C. to 100° C. where it was then reacted for 12 hours. The insoluble matters in the solution thus obtained were then removed by filtration. The filtrate was then cooled to a temperature of 25° C. To the filtrate were then added 70 parts of sodium chloride to produce a solid content which was then withdrawn by filtration. The wet cake thus obtained was then dissolved in 1,000 parts of water. To the solution thus obtained were then added 1,000 parts of isopropyl alcohol to produce a crystal which was then withdrawn by filtration. The dyestuff thus obtained was then dried to obtain 31 parts of Dyestuff No. 1 of Table 1 in the form of sodium salt.

The maximum absorption wavelength of the dyestuff thus obtained in water was 663 nm.

Preparation Example 2

173 parts of sulfanilic acid were suspended in 1,700 parts of water. To the suspension were then added 260 parts of a 35% hydrochloric acid. The mixture was then cooled to a temperature of 0° C. To the mixture were then added 73 parts of sodium sulfite at a temperature of from 0° C. to 5° C. so that the sulfanilic acid was converted to diazo form. Thereafter, to the solution were added 5 parts of sulfamic acid to obtain a diazo solution of sulfanilic acid.

Separately, 245 parts of 1,7-Cleve's acid were dissolved in 6,000 parts of water. The solution was then cooled. To the solution was then added the aforementioned diazo solution of sulfanilic acid to produce a solid content which was then withdrawn by filtration. The solid content thus obtained was then suspended in 6,000 parts of water. The suspension was then adjusted with a 25% aqueous solution of caustic soda to pH 12 to obtain a uniform solution of monoazo compound.

To the monoazo compound solution were then added 73 parts of sodium sulfite to make a solution. The solution thus obtained was then added dropwise to 6,000 parts of water at a temperature of from 0° C. to 5° C. while the pH value thereof was being adjusted to 3 with a 35% hydrochloric acid so that the monoazo compound was converted to diazo form. To the solution were then added 5 parts of sulfamic acid to obtain a diazo solution of monoazo compound.

Separately, 190 parts of 2,5-dimethoxyaniline hydrochloride were dissolved in 1,500 parts of water. The solution thus obtained was then cooled. To the solution was then added the aforementioned diazo solution of monoazo compound to produce a solid content which was then withdrawn by filtration. The solid content was then suspended in 6,000 parts of a 50% aqueous solution of N-methylpyrrolidone. The suspension thus obtained was then adjusted with a 25% aqueous solution of caustic soda to pH 12 to obtain a uniform solution of disazo compound.

To the disazo compound solution were then added 73 parts of sodium nitrite to make a solution. The solution thus obtained was then added dropwise to 6,000 parts of a 50% aqueous solution of N-methylpyrrolidone at a temperature of from 0° C. to 5° C. while the pH value thereof was being adjusted to 3 with a 35% hydrochloric acid so that the disazo compound was converted to diazo form. To the solution were then added 5 parts of sulfamic acid to obtain a diazo solution of disazo compound.

239 parts of gamma acid were suspended in 3,000 parts of water. The suspension thus obtained was then adjusted with caustic soda to pH 11 to obtain a uniform solution. The solution thus obtained was then cooled. To the solution was then added dropwise the aforementioned diazo solution of disazo compound at a temperature of from 0° C. to 5° C. to cause coupling. During the dropwise addition, the coupling bath was adjusted to a pH value of from 10 to 11 with a 25% aqueous solution of caustic soda. To the solution thus obtained were then added 900 parts of sodium chloride. The resulting crystal was withdrawn by filtration, and then dried. 66 parts of the trisazo compound thus obtained were then dissolved in 700 parts of water. To the solution were then added 24 parts of anhydrous copper sulfate and 61 parts of diethanolamine. The mixture was heated to a temperature of from 95° C. to 100° C. where it was then reacted for 12 hours. The insoluble matters in the solution thus obtained were then removed by filtration. The filtrate was then cooled to a temperature of 25° C. To the filtrate were then added 70 parts of sodium chloride to produce a solid content which was then withdrawn by filtration. The wet cake thus obtained was then dissolved in 1,000 parts of water. To the solution thus obtained were then added 1,000 parts of isopropyl alcohol to produce a crystal which was then withdrawn by filtration. The dyestuff thus obtained was then dried to obtain 31 parts of Dyestuff No. 17 of Table 1 in the form of sodium salt.

The maximum absorption wavelength of the dyestuff thus obtained in water was 658 nm.

Example 1

To 10 parts of diethylene glycol monobutyl ether, 10 parts of glycerin, 5 parts of 2-pyrrolidone, 0.5 parts of Orfin STG (surface active agent produced by Nisshin Kagaku Kogyo K.K.) and 7 parts of the aforementioned Dyestuff No. 1 of Table 1 was added water. The solution thus obtained was then adjusted with an aqueous solution of sodium hydroxide to pH 9 to make 100 parts. The composition was thoroughly mixed to make a solution which was filtered through a teflon filter having a pore diameter of 1 μm under pressure, and then subjected to deaeration by a vacuum pump and an ultrasonic cleaner to prepare a recording liquid.

Using an inkjet printer (trade name: PM-750C, produced by SEIKO EPSON COPRORATION) with the recording liquid thus obtained, a monochromatic solid inkjet recording was made on a Type MJA4SP3 inkjet photographic glossy paper (produced by SEIKO EPSON COPRORATION). During this procedure, using the halftone dot meshing function of MS-Word (word processing software produced by Microsoft Corporation), the print density was adjusted to 80% of the highest density of solid print to obtain a halftone black printed matter.

Subsequently, the image thus obtained was measured for achromaticity by Gretag Macbeth SPM50. The measurements were then quantified in the form of C* value. C* value is a numerical value indicating the magnitude of saturation of image, i.e., magnitude of achromaticity of image. The less C* value is, the lower is saturation. In other words, as a result of the measurement of achromaticity, the C* value of the halftone image was as good as 4.9. In other words, as set forth in Table 4, it was made obvious that the application of the recording liquid containing the dyestuff of Example 1 of the present invention makes it possible to obtain an improved sufficiently achromatic black image as compared with conventional dyestuffs.

Subsequently, the light-fastness of the recorded image was confirmed. Using a xenon fadeOmeter (produced by ATLAS CORP.), the recorded paper was irradiated with light for 80 hours. The degree of discoloration was measured by Gretag Macbeth SPM50 before and after irradiation. The degree of discoloration was quantified in the form of ΔE. ΔE is a numerical value indicating the degree of discoloration. The greater ΔE is, the greater is the degree of discoloration, i.e., the less is the fastness of the image to light.

As a result of the test, the light-fastness of the dyestuff on the photographic glossy paper for inkjet was as good as 5.6 as calculated in terms of ΔE. In other words, as set forth in Table 4, the application of the recording liquid containing the dyestuff of Example 1 of the present invention made it possible to reduce the degree of discoloration under light to about ¼ of that of conventional dyestuffs.

Example 2

A recording liquid was prepared and printing was made in the same manner as in Example 1 except that Dyestuff No. 2 of Table 1 was used instead of Dyestuff No. 1 of Table 1 used in Example 1. The recorded matter thus obtained was then evaluated for achromaticity and light-fastness in the same manner as in Example 1. As a result, good results of achromaticity and light-fastness were obtained as in Example 1 (see Table 4).

Comparative Example 1

A recording liquid was prepared and printing was made in the same manner as in Example 1 except that the dyestuff set forth in Table 4 (trisazo metal-containing dyestuff described in Japanese Patent Laid-Open No. 1990-75672) was use instead of Dyestuff No.1 of Table 1 used in Example 1. The recorded matter thus obtained was then evaluated for achromaticity and light-resistance in the same manner as in Example 1. The light-fastness of the recorded matter was as good as the dyestuff of the invention in Example 1. However, the image thus obtained was bluish and thus exhibited a completely insufficient achromaticity (see Table 4).

Comparative Example 2

A recording liquid was prepared in the same manner as in Example 1 except that C. I. Direct Black 195, which is an ordinary inkjet recording dyestuff, was used instead of Dyestuff No. 1 of Table 1 used in Example 1. Using the recording liquid, printing was made. The recorded matter thus obtained was then evaluated for achromaticity and light-fastness in the same manner as in Example 1. However, the image thus obtained was purplish and exhibited an insufficient achromaticity and light-fastness (see Table 4).

Example 3

A recording liquid was prepared and printing was made in the same manner as in Example 1 except that Dyestuff No. 17 of Table 1 was used instead of Dyestuff No. 1 of Table 1 used in Example 1. The recorded matter thus obtained was then evaluated for achromaticity and light-fastness in the same manner as in Example 1. As a result, achromaticity and light-fastness were as good as C* of 5.1 and ΔE of 6.1, respectively, as in Example 1 (see Table 5, which also shows the results of the aforementioned Comparative Examples 1 and 2).

Example 4

A recording liquid was prepared and printing was made in the same manner as in Example 1 except that Dyestuff No.

TABLE 4

|  | Achromaticity (C*) | Light-fastness (ΔE) |
|---|---|---|
| Example 1 | 4.9 | 5.6 |
| Example 2 | 5.9 | 5.4 |
| Comparative Example 1 | 13.5 | 7.6 |
| Comparative Example 2 | 11.2 | 21.3 |

20 of Table 1 was used instead of Dyestuff No. 1 of Table 1 used in Example 1. The recorded matter thus obtained was then evaluated for achromaticity and light-fastness in the same manner as in Example 1. As a result, achromaticity and light-fastness were as good as C* of 7.5 and ΔE of 7.2, respectively, as in Example 1 (see Table 5).

The image thus obtained was measured for achromaticity by Gretag Macbeth SPM50 in the same manner as in Example 1. The measurements were then quantified in the form of C* value. As a result, C* value of the halftone image was as good as 3.3. In other words, it was made obvious that the application of the recording liquid containing the dye-

TABLE 5

| | Achromaticity (C*) | Light-fastness (ΔE) |
|---|---|---|
| Example 3 [structure: HO₃S—Ph—N=N—naphthalene(SO₃H)—N=N—Ph(H₃CO)—N=N—naphthalene(SO₃H,NH₂) with Cu—O chelate] | 5.1 | 6.1 |
| Example 4 [structure: HO₃S—Ph—N=N—naphthalene(SO₃H)—N=N—Ph(H₃CO)—N=N—naphthalene(HO₃S,SO₃H,NH₂) with Cu—O chelate] | 7.5 | 7.2 |
| Comparative Example 1 [structure: naphthalene(SO₃H)—N=N—Ph(H₃C)—N=N—naphthalene(HO₃S)—N=N—Ph(H₂N,NH₂,SO₃H) with Cu—O chelate] | 13.5 | 7.6 |
| Comparative Example 2 [structure: HOOC—Ph(HOOC)—N=N—naphthalene—N=N—naphthalene(OH,HO₃S,NH₂)] | 11.2 | 21.3 |

Example 5

A recording liquid was prepared in the same manner as in Example 1 except that 7 parts of Dyestuff No. 1 of Table 1 and 0.5 parts of Dyestuff No. 4 of Table 3 were used instead of Dyestuff No. 1 of Table 1 used in Example 1. Subsequently, using the recording liquid thus obtained, a 80% halftone black printed matter was obtained in the same manner as in Example 1.

stuff of the present invention and the like makes it possible to obtain an improved sufficiently achromatic black image as compared with conventional dyestuffs.

Subsequently, the light-fastness of the recorded image was confirmed in the same manner as in Example 1. As a result, the light-fastness ΔE of the dyestuff of the invention on the photographic glossy paper for inkjet was as good as 3.8. Thus, the use of the recording liquid of the present invention made it possible to reduce the degree of discoloration under light to ¼ of that of the conventional dyestuffs.

Example 6

A recording liquid was prepared in the same manner as in Example 5 except that 7 parts of Dyestuff No. 2 of Table 1 was used instead of Dyestuff No. 1 of Table 1 used in Example 5 and 1 part of Dyestuff No. 7 of Table 3 was used instead of Dyestuff No. 4 of Table 3. The recording liquid thus prepared was then evaluated for achromaticity and light-fastness in the same manner as in Example 1. As a result, achromaticity and light-fastness were as good as C* of 3.2 and ΔE of 4.0, respectively, as in Example 1.

Comparative Example 3

A recording liquid was prepared in the same manner as in Example 5 except that 7 parts of C. I. Direct Black 195, which is a typical inkjet recording dyestuff, were used instead of Dyestuff No. 1 of Table 1 used in Example 5 and as a complementary dyestuff there was used 1 part of Dyestuff No. 4 of Table 3. The recording liquid thus prepared was then evaluated for achromaticity and light-fastness in the same manner as in Example 5. However, the purplishness of the image thus obtained was not extinguished. The image exhibited an insufficient achromaticity (C* value: 14.3) as well as an insufficient light-fastness (ΔE: 24.3).

Comparative Example 4

A recording liquid was prepared in the same manner as in Comparative Example 3 except that as a complementary dyestuff used in Comparative Example 3 there was used 1 part of C. I. Direct Yellow 132, which is generally used in inkjet recording, instead of Dyestuff No. 4 of Table 3. The recording liquid thus prepared was then evaluated for achromaticity and light-fastness in the same manner as in Comparative Example 3. Although the purplishness of the image thus obtained was extinguished, the image exhibited C* value of 7.6 and an insufficient light-fastness (ΔE: 28.8).

Industrial Applicability

The use of the metal chelated azo dyestuff of the present invention in an inkjet recording liquid allows recording with a sufficient light-fastness and can give a sufficiently low saturation and hence a desirable black tone even when subjected to inkjet recording on dedicated paper as recording, writing utensils, etc.

Accordingly, the recording liquid of the present invention is a black recording liquid having a good achromaticity as well as a good light-fastness and thus can be preferably used for inkjet recording, writing utensils, etc. Further, the inkjet recording liquid of the present invention can give a black recorded matter when recorded on ordinary paper. The black recorded matter is excellent in print density and fastness as well as light-fastness on glossy paper for use in photography and glossy film. The inkjet recording liquid of the present invention also has a good storage stability as recording liquid.

The recording liquid of the present invention exhibits an excellent black tone and can keep high light-fastness even when it contains a complementary dyestuff incorporated therein for toning.

What is claimed is:
1. A metal chelated azo dyestuff for inkjet recording characterized in that its free acid form is represented by the following general formula (1):

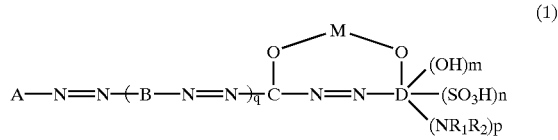

(wherein the general formula (1) represents a compound having at least one or more hydrophilic group per molecule; M represents an arbitrary metal; A, B and C each independently represents an aromatic ring which may have arbitrary substituents; D represents an aromatic ring which may have arbitrary substituents other than azo group; m represents an integer of 0 to 1; n represents an integer of from 0 to 3; p represents an integer of from 0 to 2; q represents an integer of from 1 to 3, with the proviso that if there are a plurality of B's, they may be the same or different; $R_1$ and $R_2$ each independently represents hydrogen atom or arbitrary substituent; M can take tridentate or higher coordination in which M may take arbitrary ligand-to-metal coordination at arbitrary substituent or bond in the general formula (1) or with arbitrary ligands; and a metal ion may be further coordinated to A and B, B and B which are adjacent to each other with an azo group interposed therebetween if there are a plurality of B's or B and C in the form of —O—M—O—),
wherein when B is phenylene, the phenylene is substituted by at least one substituent selected from the group consisting of halogen atom, phosphono group, carboxyl group, hydroxyl group, nitro group, alkyl group which may be substituted, alkoxyl group which may be substituted, amino group which may be substituted, acylamino group which may be substituted and sulfonylamino group which may be substituted; and when D is a naphthalene ring, m is 0, and n and p are each 1, $(NR_1R_2)$ is not acylamino.

2. A metal chelated azo dyestuff for inkjet recording characterized in that its free acid form is represented by the following general formula (1'):

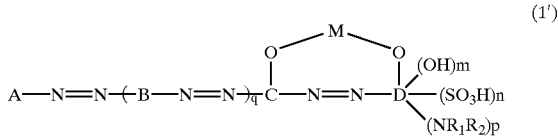

(wherein the general formula (1') represents a compound having at least one or more hydrophilic group per molecule; M represents an arbitrary metal; A, B and C each independently represents an aromatic ring which may have arbitrary substituents; D represents an aromatic ring which may have arbitrary substituents other than azo group; m represents an integer of 0 to 1; n represents an integer of from 0 to 3; p represents an integer of from 0 to 2; q represents an integer of from 1 to 3, with the proviso that if there are a plurality of B's, they may be the same or different; $R_1$ and $R_2$ each independently represents hydrogen atom or arbitrary substituent; and M can take tridentate or higher coordination in which M may take arbitrary ligand-to-metal coordination at arbitrary substituent or bond in the general formula (1') or with arbitrary ligands), wherein when B is phenylene, the phenylene is substituted by at least one substituent selected from the group consisting of halogen atom, phosphono group, carboxyl group, hydroxyl group, nitro group, alkyl group which may be substituted, alkoxyl group which may be substituted, amino group which may be substituted, acylamino group which may be substituted and sulfonylamino group which may be substituted; and when D is a naphthalene ring, m is 0, and n and p are each 1, $(NR_1R_2)$ is not acylamino.

3. A metal chelated azo dyestuff for inkjet recording as defined in claim 1, wherein in the aforementioned general formula (1), p is 1 or 2.

4. A metal chelated azo dyestuff for inkjet recording as defined in claim 1, wherein in the aforementioned general formula (1), D is a naphthalene ring.

5. A metal chelated azo dyestuff for inkjet recording as defined in claim 1, wherein in the aforementioned general formula (1), A represents phenyl group which may be substituted or naphthyl group which may be substituted; and B and C each independently represents phenylene group which may be substituted or naphthylene group which may be substituted, with the proviso that if A, B or C has substituents, the substituents for A are at least one substituent selected from the group consisting of halogen atom, phosphono group, sulfonic acid group, carboxyl group, hydroxyl group, nitro group, alkyl group which may be substituted, alkoxyl group which may be substituted, amino group which may be substituted, acylamino group which may be substituted, sulfonylamino group which may be substituted, phenylazo group which may be substituted and naphthylazo group which may be substituted and the substituents for B and C are at least one substituent selected from the group consisting of halogen atom, phosphono group, sulfonic acid group, carboxyl group, hydroxyl group, nitro group, alkyl group which may be substituted, alkoxyl group which may be substituted, amino group which may be substituted, acylamino group which may be substituted and sulfonylamino group which may be substituted.

6. A metal chelated azo dyestuff for inkjet recording as defined in claim 1, wherein in the aforementioned general formula (1), D has at least one substituent selected from the group consisting of halogen atom, carboxyl group, hydroxyl group, nitro group, alkyl group which may be substituted, alkoxyl group which may be substituted, amino group which may be substituted, acylamino group which may be substituted, sulfonylamino group which may be substituted, alkoxycarbonyl group and aminocarbonyl group in addition to those defined in the general formula (1).

7. A metal chelated azo dyestuff for inkjet recording as defined in claim 1, wherein in the aforementioned general formula (1), $R_1$ and $R_2$ each independently is selected from the group consisting of hydrogen atom, alkyl group which may be substituted, phenyl group which may be substituted, acyl group which may be substituted, sulfonyl group which may be substituted and triazinyl group which may be substituted.

8. A metal chelated azo dyestuff for inkjet recording as defined in claim 1, wherein in the aforementioned general formula (1), $R_1$ is selected from the group consisting of hydrogen atom, alkyl group which may be substituted, phenyl group which may be substituted, acyl group which may be substituted, sulfonyl group which may be substituted and triazinyl group which may be substituted and $R_2$ is selected from the group consisting of alkyl group which may be substituted, phenyl group which may be substituted, acyl group which may be substituted, sulfonyl group which may be substituted and triazinyl group which may be substituted.

9. A metal chelated azo dyestuff for inkjet recording as defined in claim 1, wherein in the aforementioned general formula (1), m is 0.

10. A metal chelated azo dyestuff for inkjet recording as defined in claim 1, wherein in the aforementioned general formula (1), n is 1 or 2.

11. A metal chelated azo dyestuff for inkjet recording as defined in claim 1, wherein in the aforementioned general formula (1), p is 1.

12. A metal chelated azo dyestuff for inkjet recording as defined in claim 1, wherein in the aforementioned general formula (1), M is copper, nickel, iron or cobalt.

13. A metal chelated azo dyestuff for inkjet recording as defined in claim 1, wherein the aforementioned general formula (1) is a compound having three azo groups per molecule.

14. A metal chelated azo dyestuff for inkjet recording as defined in claim 1, wherein the aforementioned general formula (1) is a compound containing from 2 to 6 hydrophilic groups.

15. A recording liquid comprising a metal chelated azo dyestuff the free acid form of which is represented by the general formula (1) and an aqueous medium,

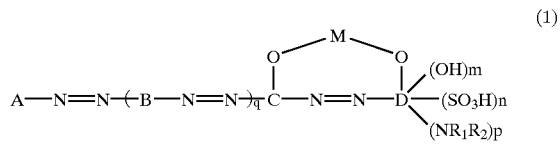

(wherein the general formula (1) represents a compound having at least one or more hydrophilic group per molecule; M represents an arbitrary metal; A, B and C each independently represents an aromatic ring which may have arbitrary substituents; D represents an aromatic ring which may have arbitrary substituents other than azo group; m represents an integer of 0 to 1; n represents an integer of from 0 to 3; p represents an integer of from 0 to 2; q represents an integer of from 1 to 3, with the proviso that if there are a plurality of B's, they may be the same or different; $R_1$ and $R_2$ each independently represents hydrogen atom or arbitrary substituent; M can take tridentate or higher coordination in which M may take arbitrary ligand-to-metal coordination at arbitrary substituent or bond in the general formula (1) or with arbitrary ligands; and a metal ion may be further coordinated to A and B, B and B which are adjacent to each other with an azo group interposed therebetween if there are a plurality of B's or B and C in the form of —O—M—O—), wherein when B is phenylene, the phenylene is substituted by at least one substituent selected from the group consisting of halogen atom, phosphono group, carboxyl group, hydroxyl gioup, nitro group, alkyl group which may be substituted, alkoxyl group which may be substituted, amino group which may be substituted, acylamino group which may be substituted and sulfonylamino group which may be substituted.

16. A recording liquid comprising a metal chelated azo dyestuff the free acid form of which is represented by the general formula (1') and an aqueous medium,

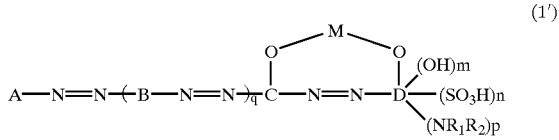

(wherein the general formula (1') represents a compound having at least one or more hydrophilic group per molecule; M represents an arbitrary metal; A, B and C each independently represents an aromatic ring which may have arbitrary substituents; D represents an aromatic ring which may have arbitrary substituents other than azo group; m represents an integer of 0 to 1; n represents an integer of from 0 to 3; p represents an integer of from 0 to 2; q represents an integer of from 1 to 3, with the proviso that if there are a plurality of B's, they may be the same or different; $R_1$ and $R_2$ each independently represents hydrogen atom or arbitrary substituent; and M can take tridentate or higher coordination in which M may take arbitrary ligand-to-metal coordination at arbitrary substituent or bond in the general formula (1') or with arbitrary ligands), wherein when B is phenylene, the phenylene is substituted by at least one substituent selected from the group consisting of halogen atom, phosphono group, carboxyl group, hydroxyl group, nitro group, alkyl group which may be substituted, alkoxyl group which may be substituted, amino group which may be substituted, acylamino group which may be substituted and sulfonylamino group which may be substituted.

17. A recording liquid as defined in claim 15, wherein in the aforementioned general formula (1), p is 1 or 2.

18. A recording liquid as defined in claim 15, wherein in the aforementioned general formula (1), D is a naphthalene ring.

19. A recording liquid as defined in claim 15, wherein in the aforementioned general formula (1), A represents phenyl group which may be substituted or naphthyl group which may be substituted; and B and C each independently represents phenylene group which may be substituted or naphthylene group which may be substituted, with the proviso that if A, B or C has substituents, the substituents for A are at least one substituent selected from the group consisting of halogen atom, phosphono group, sulfonic acid group, carboxyl group, hydroxyl group, nitro group, alkyl group which may be substituted, alkoxyl group which may be substituted, amino group which may be substituted, acylamino group which may be substituted, sulfonylamino group which may be substituted, phenylazo group which may be substituted and naphthylazo group which may be substituted and the substituents for B and C are at least one substituent selected from the group consisting of halogen atom, phosphono group, sulfonic acid group, carboxyl group, hydroxyl group, nitro group, alkyl group which may be substituted, alkoxyl group which may be substituted, amino group which may be substituted, acylamino group which may be substituted and sulfonylamino group which may be substituted.

20. A recording liquid as defined in claim 15, wherein in the aforementioned general formula (1), D has at least one substituent selected from the group consisting of halogen atom, carboxyl group, hydroxyl group, nitro group, alkyl group which may be substituted, alkoxyl group which may be substituted, amino group which may be substituted, acylamino group which may be substituted, sulfonylamino group which may be substituted, alkoxycarbonyl group and aminocarbonyl group in addition to those defined in the general formula (1).

21. A recording liquid as defined in claim 15, wherein in the aforementioned general formula (1), $R_1$ and $R_2$ each independently is selected from the group consisting of hydrogen atom, alkyl group which may be substituted, phenyl group which may be substituted, acyl group which may be substituted, sulfonyl group which may be substituted and triazinyl group which may be substituted.

22. A recording liquid as defined in claim 15, wherein in the aforementioned general formula (1), $R_1$ is selected from the group consisting of hydrogen atom, alkyl group which may be substituted, phenyl group which may be substituted, acyl group which may be substituted, sulfonyl group which may be substituted and triazinyl group which may be substituted and $R_2$ is selected from the group consisting of alkyl group which may be substituted, phenyl group which may be substituted, acyl group which may be substituted, sulfonyl group which may be substituted and triazinyl group which may be substituted.

23. A recording liquid as defined in claim 15, wherein in the aforementioned general formula (1), m is 0.

24. A recording liquid as defined in claim 15, wherein in the aforementioned general formula (1), n is 1 or 2.

25. A recording liquid as defined in claim 15, wherein in the aforementioned general formula (1), p is 1.

26. A recording liquid as defined in claim 15, wherein in the aforementioned general formula (1), M is copper, nickel, iron or cobalt.

27. A recording liquid as defined in claim 15, wherein the aforementioned general formula (1) is a compound having three azo groups per molecule.

28. A recording liquid as defined in claim 15, wherein the aforementioned general formula (1) is a compound containing from 2 to 6 hydrophilic groups per molecule.

29. A recording liquid as defined in claim 15, wherein there is incorporated a dyestuff represented by the general formula (1) in an amount of from 0.5% to 10% by weight based on the total amount thereof.

30. A recording liquid as defined in claim 15, comprising water and a water soluble organic solvent incorporated therein wherein water is incorporated in an amount of from 45% to 95% by weight based on the total amount of the recording liquid and the water soluble organic solvent is incorporated in an amount of from 1% to 50% by weight based on the total amount of the recording liquid.

31. A recording liquid comprising an aqueous medium, i) at least one black metal chelated azo dyestuff the free acid form of which is represented by the following general formula (8) and ii) at least one or more other water soluble dyestuff:

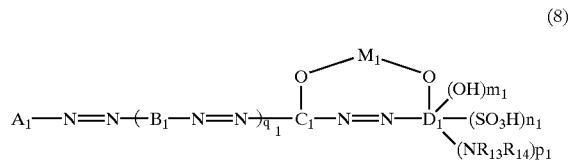

(wherein the general formula (8) represents a compound having at least one or more hydrophilic group per molecule; $M_1$ represents an arbitrary metal; $A_1$, $B_1$ and $C_1$ each independently represents an aromatic ring which may have arbitrary substituents; $D_1$ represents an aromatic ring which may have arbitrary substituents other than azo group; $m_1$ represents an integer of 0 to 1; $n_1$ represents an integer of from 0 to 3; $p_1$ represents an integer of from 0 to 2; $q_1$ represents an integer of from 0 to 3, with the proviso that if there are a plurality of $B_1$'s, they may be the same or different; $R_{13}$ and $R_{14}$ each independently represents hydrogen atom or arbitrary substituent; $M_1$ can take tridentate or higher coordination in which $M_1$ may take arbitrary ligand-to-metal coordination at arbitrary substituent or bond in the general formula (8) or with arbitrary ligands; and a metal ion may be further coordinated to $A_1$ and $B_1$, $B_1$ and $B_1$ which are adjacent to each other with an azo group interposed therebetween if there are a plurality of $B_1$'s or $B_1$ and $C_1$ in the form of —O—M—O—).

32. A recording liquid comprising an aqueous medium, i) at least one black metal chelated azo dyestuff the free acid form of which is represented by the following formula (8') and ii) at least one or more other water soluble dyestuff:

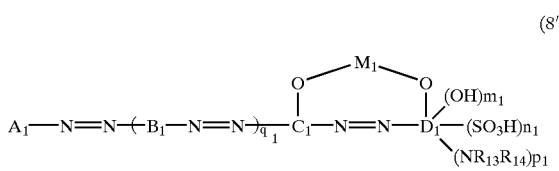

(8')

(wherein the general formula (8') represents a compound having at least one or more hydrophilic group per molecule; $M_1$ represents an arbitrary metal; $A_1$, $B_1$ or $C_1$ each independently represents an aromatic ring which may have arbitrary substituents; $D_1$ represents an aromatic ring which may have arbitrary substituents other than azo group; $m_1$ represents an integer of 0 to 1; $n_1$ represents an integer of from 0 to 3; $p_1$ represents an integer of from 0 to 2; $q_1$ represents an integer of from 0 to 3, with the proviso that if there are a plurality of $B_1$'s, they may be the same or different; $R_{13}$ and $R_{14}$ each independently represents hydrogen atom or arbitrary substituent; and $M_1$ can take tridentate or higher coordination in which $M_1$ may take arbitrary ligand-to-metal coordination at arbitrary substituent or bond in the general formula (8') or with arbitrary ligands).

33. A recording liquid as defined in claim 31, wherein in the aforementioned general formula (8), $D_1$ is a naphthalene ring.

34. A recording liquid as defined in claim 31, wherein in the aforementioned general formula (8), $A_1$ represents phenyl group which may be substituted or naphthyl group which may be substituted; and $B_1$ and $C_1$ each independently represents phenylene group which may be substituted or naphthylene group which may be substituted, with the proviso that if $A_1$, $B_1$ or $C_1$ has substituents, the substituents are at least one substituent selected from the group consisting of halogen atom, phosphono group, sulfonic acid group, carboxyl group, hydroxyl group, nitro group, alkyl group which may be substituted, alkoxyl group which may be substituted, amino group which may be substituted, acylamino group which may be substituted and sulfonylamino group which may be substituted.

35. A recording liquid as defined in claim 31, wherein in the aforementioned general formula (8), wherein $m_1$ is 0, $n_1$ is 1 to 2 and $p_1$ is 1.

36. A recording liquid as defined in claim 31, wherein in the aforementioned general formula (8), wherein $q_1$ is an integer of from 1 to 3.

37. A recording liquid as defined in claim 31, wherein in the aforementioned general formula (8), wherein $q_1$ is 1.

38. A recording liquid as defined in claim 31, wherein in the aforementioned general formula (8), wherein one of $R_{13}$ and $R_{14}$ is a hydrogen atom and the other is a phenyl group which may be substituted.

39. A recording liquid as defined in claim 31, wherein in the aforementioned general formula (8), wherein both $R_{13}$ and $R_{14}$ each is hydrogen atom.

40. A recording liquid as defined in claim 31, wherein in the aforementioned general formula (8), wherein $M_1$ is copper, nickel, iron or cobalt.

41. A recording liquid as defined in claim 31, wherein the other water soluble dyestuff is an azo-based water soluble dyestuff.

42. A recording liquid as defined in claim 31, wherein the other water soluble dyestuff is a water soluble dyestuff the free acid form of which is represented by the following general formula (2):

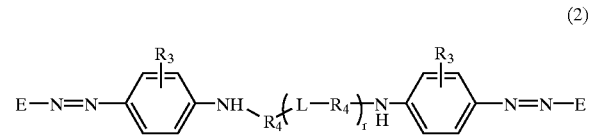

(2)

(wherein E represents phenyl group which may be substituted or naphthyl group which may be substituted; $R_3$ represents hydrogen atom, halogen atom, alkyl group having from 1 to 4 carbon atoms, alkoxy group having from 1 to 4 carbon atoms, carboxyl group or sulfonic acid group; $R_4$ represents carbonyl group or triazinyl group which may be substituted; L represents an arbitrary connecting group; and r represents 0 or 1, with the proviso that a plurality of E's, $R_3$'s and $R_4$'s which are present in the molecule each maybe the same or different).

43. A recording liquid as defined in claim 31, wherein the other water soluble dyestuff is a water soluble dyestuff the free acid form of which is represented by the following general formula (3):

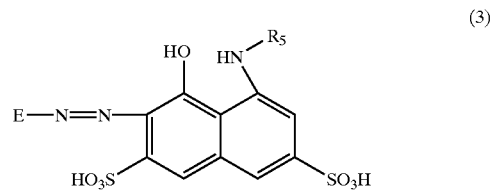

(3)

(wherein in the formula (3) $R_5$ represents hydrogen atom, alkyl group having from 1 to 4 carbon atoms, acyl group or triazinyl group which may be substituted; and E represents phenyl group which may be substituted or naphthyl group which may be substituted).

44. A recording liquid as defined in claim 43, wherein the other water soluble dyestuff is a water soluble dyestuff the free acid form of which is represented by the following general formula (4):

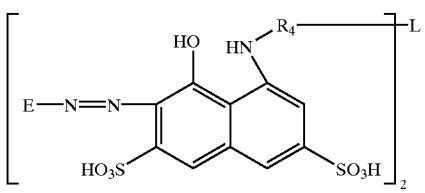

(4)

(wherein in the formula (4) E represents phenyl group which may be substituted or naphthyl group which may be substituted; $R_4$ represents carbonyl group or triazinyl group which may be substituted; and L represents an arbitrary connecting group).

45. A recording liquid as defined in claim 31, wherein the other water soluble dyestuff is a water soluble dyestuff the free acid form of which is represented by the following general formula (5):

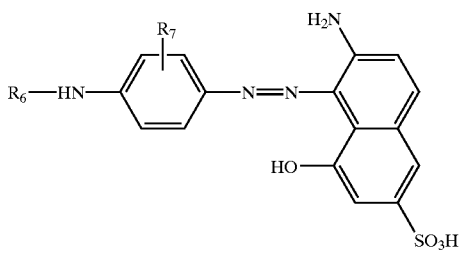

(5)

(wherein in the formula (5) $R_6$ represents triazinyl group which may be substituted; and $R_7$ represents hydrogen atom, halogen atom, alkyl group having from 1 to 4 carbon atoms, alkoxy group having from 1 to 4 carbon atoms, carboxyl group or sulfonic acid group).

46. A recording liquid as defined in claim 31, wherein the other water soluble dyestuff is an anthrapyridone-based water soluble dyestuff the free acid form of which is represented by the following general formula (6):

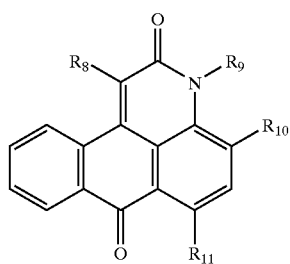

(6)

(wherein in the formula (6) $R_8$ represents hydrogen atom, halogen atom, cyano group, alkyl group which may be substituted, alkoxy group which may be substituted, alkoxycarbonyl group which may be substituted or acyl group which may be substituted; $R_9$ represents hydrogen atom, alkyl group which may be substituted or alkoxy group which may be substituted; $R_{10}$ represents hydrogen atom, alkyl group which may be substituted, alkoxy group which may be substituted or phenoxy group which may be substituted; and $R_{11}$ represents hydrogen atom, halogen atom, amino group which may be substituted or anilino group which may be substituted).

47. A recording liquid as defined in claim 31, wherein the other water soluble dyestuff is a metal chelated azo dyestuff formed by an azo compound the free acid form of which is represented by the following general formula (7) and a metal element:

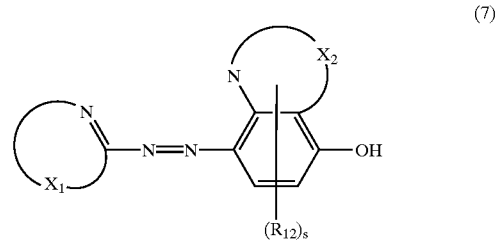

(7)

(wherein in the formula (7) $X_1$ and $X_2$ each independently represents a plurality of atoms required to form at least one 5- to 7-membered aromatic ring, with the proviso that the aromatic rings containing $X_1$ or $X_2$ each may have substituents, the substituents on the aromatic rings may be further condensed to form condensed rings and the aromatic rings containing $X_1$ or $X_2$ each may contain heteroatoms; $R_{12}$ represents hydroxyl group, carboxyl group, sulfonic acid group, phosphono group, alkyl group, alkoxy group or amino group which may be substituted; and s represents an integer of from 1 to 5, with the proviso that if there are a plurality of $R_{12}$'s, they may be the same or different).

48. A recording liquid as defined in claim 31, wherein the other water soluble dyestuff is a metal phthalocyanine dyestuff.

49. A recording liquid for inkjet comprising a recording liquid as defined in claim 31.

50. An inkjet recording method comprising using a recording liquid as defined in claim 15 or 31.

51. A metal chelated azo dyestuff for inkjet recording characterized in that its free acid form is represented by the following general formula (1):

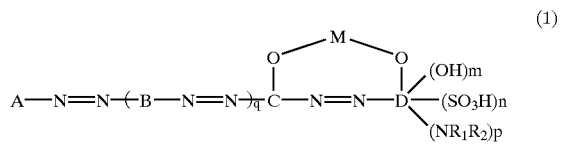

(1)

(wherein the general formula (1) represents a compound having at least one or more hydrophilic group per molecule; M represents an arbitrary metal; A, B and C each independently represents an aromatic ring which may have arbitrary substituents; D represents an aromatic ring which may have arbitrary substituents other than azo group; m represents an integer of 0 to 1; n represents an integer of from 0 to 3; p represents an integer of from 0 to 2; q represents an integer of from 1 to 3, with the proviso that if there are a plurality of B's, they may be the same or different; $R_1$ and $R_2$ each independently represents hydrogen atom or arbitrary substituent; M can take tridentate or higher coordination in which M may take arbitrary ligand-to-metal coordination at arbitrary substituent or bond in the general formula (1) or with arbitrary ligands; and a metal ion may be further coordinated to A and B, B and B which are adjacent to each other with an azo group interposed therebetween if there are a plurality of B's or B and C in the form of —O—M—O—) wherein B is a naphthalene ring which may be substituted when q is 1, or at least one B is a naphthalene ring which may be substituted when q is 2 or 3.

52. A metal chelated azo dyestuff selected from the group consisting of compound nos. 1 through 53 in Table 1 of the specification.

53. A metal chelated azo dyestuff for inkjet recording characterized in that its free acid form is represented by the following general formula (1):

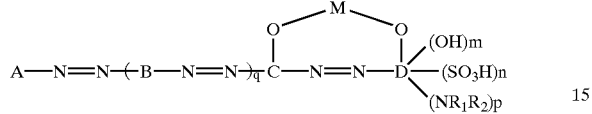
(1)

(wherein the general formula (1) represents a compound having at least one or more hydrophilic group per molecule; M represents an arbitrary metal; A is selected from the group consisting of (A-1) through (A-12); B is selected from the group consisting of (B-1) through (B-10); C is selected from the group consisting of (C-1) through (C-4); and $D(O)(OH)_m(SO_3H)_n(NR_1R_2)_p$ is selected from the group consisting of (D-1) through (D-14), all of the specification.

* * * * *